United States Patent
Chen et al.

(10) Patent No.: US 11,202,064 B2
(45) Date of Patent: Dec. 14, 2021

(54) INTER MODES WITH WEIGHTING-AVERAGED PREDICTION, SYMMETRIC MVD OR AFFINE MOTION IN VIDEO CODING

(71) Applicant: QUALCOMM Incorporated, San Diego, CA (US)

(72) Inventors: Chun-Chi Chen, San Diego, CA (US); Wei-Jung Chien, San Diego, CA (US); Han Huang, San Diego, CA (US); Yao-Jen Chang, San Diego, CA (US); Kevin Pascal Andre Reuze, Voisins le bretonneux (FR); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/909,772

(22) Filed: Jun. 23, 2020

(65) Prior Publication Data
US 2020/0404253 A1    Dec. 24, 2020

Related U.S. Application Data

(60) Provisional application No. 62/865,876, filed on Jun. 24, 2019.

(51) Int. Cl.
*H04N 7/12* (2006.01)
*H04N 19/105* (2014.01)
(Continued)

(52) U.S. Cl.
CPC ......... *H04N 19/105* (2014.11); *B23K 20/127* (2013.01); *B23P 15/00* (2013.01);
(Continued)

(58) Field of Classification Search
CPC .. H04N 19/105; H04N 19/137; H04N 19/176; H04N 19/30; H04N 19/46;
(Continued)

(56) References Cited

U.S. PATENT DOCUMENTS

2018/0192069 A1*  7/2018  Chen ..................... H04N 19/51
2018/0278949 A1*  9/2018  Karczewicz ......... H04N 19/513
(Continued)

OTHER PUBLICATIONS

Bossen: "Guidelines for VVC Reference Software Development", Joint Video Experts Team (JVET) of ITU-T SG16 WP3 and ISO/IEC JTC1/SC29/WG11, 14th Meeting: Geneva, CH, Mar. 19-27, 2019, JVET-N1003, pp. 1-8.
(Continued)

*Primary Examiner* — Gims S Philippe
(74) *Attorney, Agent, or Firm* — Shumaker & Sieffert, P.A.

(57) ABSTRACT

A video coder is configured to form, in a symmetric motion vector difference mode, a List 0 (L0) base vector using a L0 Advanced Motion Vector Prediction (AMVP) candidate list and a List 1 (L1) base vector using a L1 AMVP candidate list; determine a refined L0 motion vector and a refined L1 motion vector by performing a decoder-side motion vector refinement process that refines the L0 base vector and the L1 base vector; and use the refined L0 motion vector and the refined L1 motion vector to determine a prediction block for a current block of a current picture of the video data.

17 Claims, 17 Drawing Sheets

(51) Int. Cl.
*H04N 19/137* (2014.01)
*H04N 19/176* (2014.01)
*H04N 19/30* (2014.01)
*H04N 19/46* (2014.01)
*B23K 20/12* (2006.01)
*B23P 15/00* (2006.01)
*G11B 33/14* (2006.01)
*B23K 101/36* (2006.01)

(52) U.S. Cl.
CPC ...... *G11B 33/1406* (2013.01); *G11B 33/1486* (2013.01); *H04N 19/137* (2014.11); *H04N 19/176* (2014.11); *H04N 19/30* (2014.11); *H04N 19/46* (2014.11); *B23K 2101/36* (2018.08)

(58) Field of Classification Search
CPC .................. B23K 20/127; B23K 2101/36; B23K 20/122; B23K 26/21; B23P 15/00; G11B 33/1406; G11B 33/1486; G11B 33/14
USPC ........................................ 375/240.02
See application file for complete search history.

(56) References Cited

U.S. PATENT DOCUMENTS

| | | | |
|---|---|---|---|
| 2020/0169748 A1* | 5/2020 | Chen | H04N 19/577 |
| 2020/0314445 A1* | 10/2020 | Park | H04N 19/52 |
| 2020/0374551 A1* | 11/2020 | Chiang | H04N 19/70 |

OTHER PUBLICATIONS

Bross et al., "Versatile Video Coding (Draft 5)", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1001-v8, 399 Pages, XP030212626, Retrieved from the Internet: URL: http://phenix.int-evry.fr/mpeg/doc_end_user/documents/126_Geneva/wg11/m48053JVET-N1001-v8-JVET-N1001-v8.zip. JVET-N1001-v8.docx. [retrieved on Jun. 11, 2019].

Chen J, et al., "Algorithm Description for Versatile Video Coding and Test Model 5 (VTM 5)", 126. MPEG Meeting; Mar. 19, 2019-Mar. 27, 2019; Geneva; (Motion Picture Expert Group or ISO/I EC JTC1/SC29/WG11), JVET-N1002-v2, No. m48054, Jun. 11, 2019 (Jun. 11, 2019), XP030212630, Retrieved from the Internet: URL: http://phenix.int-evry.fr/mpeg/doc_end_user/documents/126_Geneva/wg11/m48054-JVET-N1002-v2-JVET-N1002-v2.zip JVET-N1002-v2.docx, retrieved on Jun. 11, 2019], 76 pages.

Chen J., et al., "Algorithm Description of Joint Exploration Test Model 1", 1, JVET Meeting, Oct. 19-21, 2015, Geneva;(The Joint Video Exploration Team of ISO/IEC JTC1/SC29/WG11 and ITU-T SG.16); URL: http://phenix.int-evry.fr/jvet/, No. JVET-A1001, Feb. 24, 2016 (Feb. 24, 2016), XP030150000, 27 Pages.

JVET: "VTM—4.0, Tags, JVET/VVCSoftware_VTM, GitLab", Frank Bossen, https://vcgit.hhi.fraunhofer.de/jvet/VVCSoftware_VTM/-/tags/VTM-4.0, pp. 1-2.

Sullivan G.J., et al., "Overview of the High Efficiency Video Coding (HEVC) Standard", IEEE Transactions on Circuits and Systems for Video Technology, vol. 22, No. 12, Dec. 2012, pp. 1649-1668.

U.S. Appl. No. 16/893,052, filed Jun. 4, 2020.

* cited by examiner

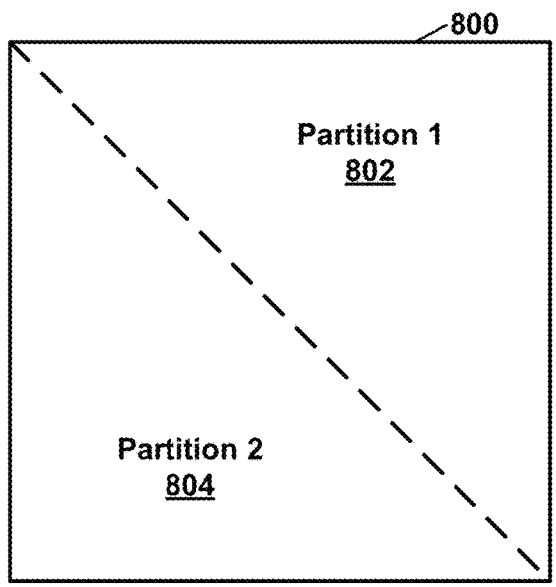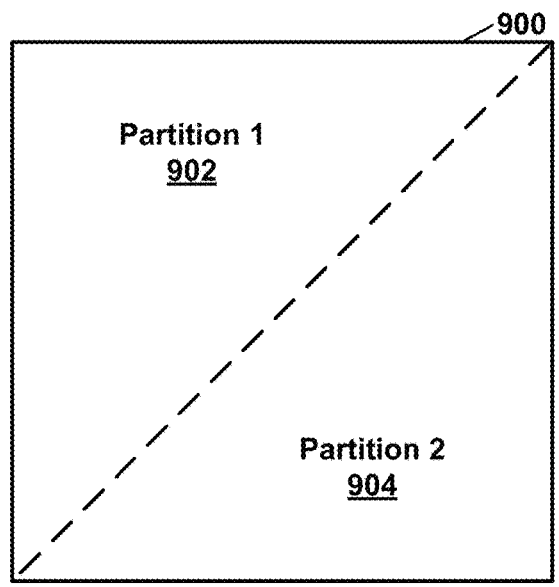
FIG. 8  FIG. 9

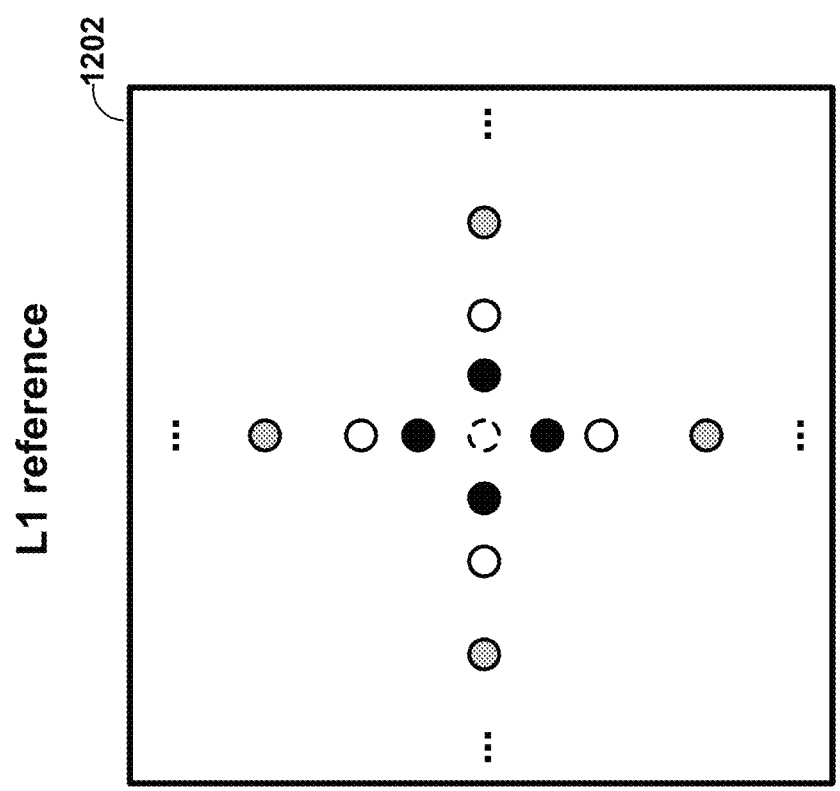
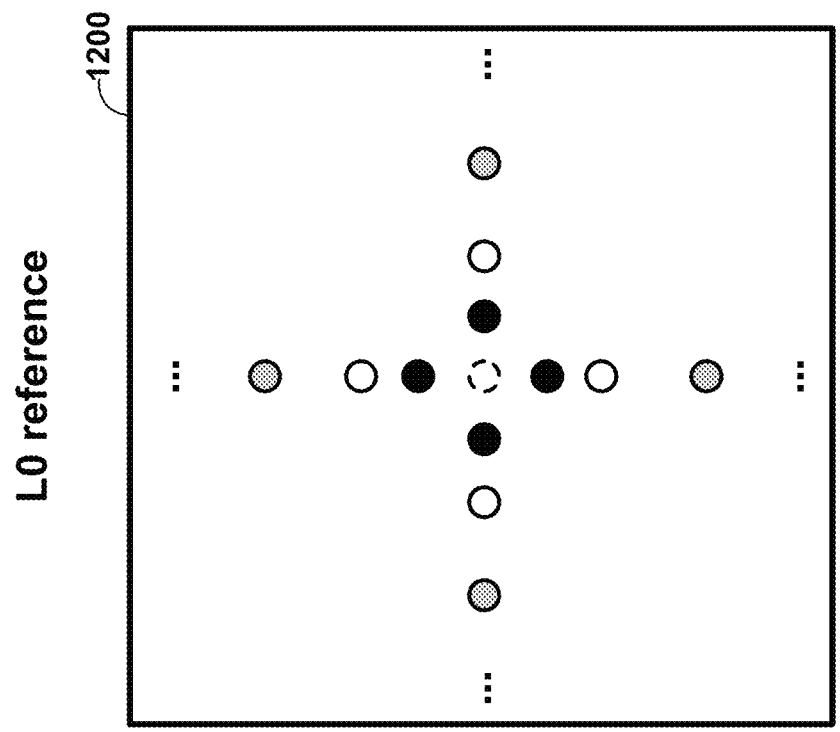
FIG. 12

INTER MODES WITH WEIGHTING-AVERAGED PREDICTION, SYMMETRIC MVD OR AFFINE MOTION IN VIDEO CODING

This application claims the benefit of U.S. Provisional Patent Application 62/865,876, filed Jun. 24, 2019, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to inter prediction modes with weighting-average prediction (e.g., triangle prediction merge mode (TPM), combined intra-inter prediction (CIIP)), with symmetric motion vector differences (i.e., merge mode with MVD (MMVD), symmetric MVC (SMVD), decoder-side motion vector refinement (DMVR)) or affine motion. The techniques of this disclosure may be applied to any of the existing video codecs, such as HEVC (High Efficiency Video Coding), VVC (Versatile Video Coding), Essential Video Coding (EVC), or be an efficient coding tool in any future video coding standards.

As described herein, use of SMVD may allow a video encoder to skip signaling of a list 0 reference index, a list 1 reference index, and a list 1 motion vector difference. However, use of SMVD prevents a video encoder from selecting non-symmetrical motion vectors, even if slightly different list 0 and list 1 motion vectors may be advantageous. This disclosure describes techniques that may address this problem. For instance, in accordance with a technique of this disclosure, a video coder may apply DMVR in the context AMVP and SMVD. For instance, in one example, this disclosure describes a video coder that forms, in a symmetric motion vector difference mode, a List 0 (L0) base vector using a L0 AMVP candidate list and a List 1 (L1) base vector using a L1 AMVP candidate list. Furthermore, the video coder may determine a refined L0 motion vector and a refined L1 motion vector by performing a DMVR process that refines the L0 base vector and the L1 base vector. The video coder may use the refined L0 motion vector and the refined L1 motion vector to determine a prediction block for a current block of a current picture of the video data.

In one example, this disclosure describes a method of coding video data, the method comprising: forming, in a symmetric motion vector difference mode, a L0 base vector using a L0 Advanced Motion Vector Prediction (AMVP) candidate list and forming a L1 base vector using a L1 AMVP candidate list; determining a refined L0 motion vector and a refined L1 motion vector by performing a decoder-side motion vector refinement process that refines the L0 base vector and the L1 base vector, wherein the refined L0 motion vector indicates a location in an L0 reference picture in a reference picture list L0 and the refined L0 motion vector indicates a location in an L1 reference picture in a reference picture list L1; and using the refined L0 motion vector and the refined L1 motion vector to determine a prediction block for a current block of a current picture of the video data.

In another example, this disclosure describes a device for coding video data, the device comprising: a memory to store the video data; and one or more processors implemented in circuitry, the one or more processors configured to: form, in a symmetric motion vector difference mode, a List 0 (L0) base vector using a L0 AMVP candidate list and form a L1 base vector using a L1 AMVP candidate list; determine a refined L0 motion vector and a refined 1 motion vector by performing a decoder-side motion vector refinement process that refines the L0 base vector and the L1 base vector, wherein the refined L0 motion vector indicates a location in an L0 reference picture in a reference picture list L0 and the refined L0 motion vector indicates a location in an L1 reference picture in a reference picture list L1; and use the refined L0 motion vector and the refined L1 motion vector to determine a prediction block for a current block of a current picture of the video data.

In another example, this disclosure describes a device for coding video data, the device comprising: means for forming, in a symmetric motion vector difference mode, a L0 base vector using a L0 AMVP candidate list and forming a L1 base vector using a L1 AMVP candidate list; means for determining a refined L0 motion vector and a refined L1 motion vector by performing a decoder-side motion vector refinement process that refines the L0 base vector and the L1 base vector, wherein the refined L0 motion vector indicates a location in an L0 reference picture in a reference picture list L0 and the refined L0 motion vector indicates a location in an L1 reference picture in a reference picture list L1; and means for using the refined L0 motion vector and the refined L1 motion vector to determine a prediction block for a current block of a current picture of the video data.

In another example, this disclosure describes a computer-readable storage medium having stored thereon instructions that, when executed, cause one or more processors to: form, in a symmetric motion vector difference mode, a L0 base vector using a L0 AMVP candidate list and form a L1 base vector using a L1 AMVP candidate list; determine a refined L0 motion vector and a refined L1 motion vector by performing a decoder-side motion vector refinement process that refines the L0 base vector and the L1 base vector, wherein the refined L0 motion vector indicates a location in an L0 reference picture in a reference picture list L0 and the refined L0 motion vector indicates a location in an L1 reference picture in a reference picture list L1; and use the refined L0 motion vector and the refined L1 motion vector to determine a prediction block for a current block of a current picture of video data.

The details of one or more examples are set forth in the accompanying drawings and the description below. Other features, objects, and advantages will be apparent from the description, drawings, and claims.

BRIEF DESCRIPTION OF DRAWINGS

FIG. 8 is a conceptual diagram illustrating triangle partition-based inter prediction with diagonal splitting.

FIG. 9 is a conceptual diagram illustrating triangle partition-based inter prediction with anti-diagonal splitting.

FIG. 12 is a conceptual diagram that illustrates Merge Mode with Motion Vector Difference (MMVD) search points.

DETAILED DESCRIPTION

Figure 1:
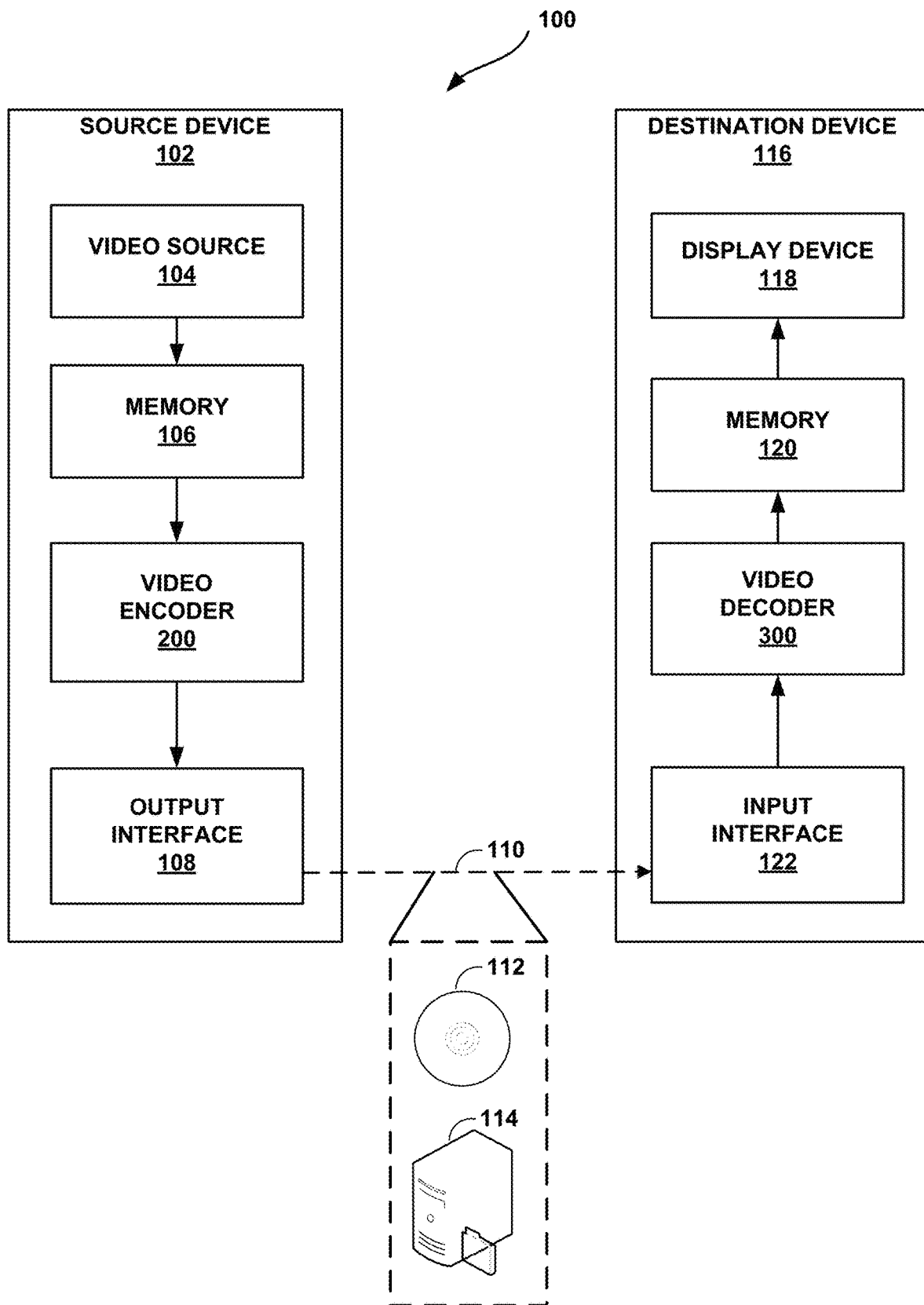
FIG. 1 is a block diagram illustrating an example video encoding and decoding system that may perform the techniques of this disclosure.

Decoder-side motion vector refinement (DMVR) is a process in which a video decoder determines a pair of initial motion vectors and then performs a searching process to refine the initial motion vectors. The video decoder may then use the refined motion vector to determine a prediction block. To determine the initial motion vectors, the video coder may generate a merge candidate list. The video decoder may then determine, based on an index signaled in a bitstream, a selected candidate in the merge candidate list. The selected candidate specifies the pair of initial motion vectors.

Advanced motion vector prediction (AMVP) is another technique for determining motion vectors. A video coder (e.g., a video encoder or a video decoder) maintains two lists of reference pictures, List 0 (L0) and List 1 (L1), for a current picture. The video coder may determine a L0 motion vector and a L1 motion vector for a current block of the current picture. The L0 motion vector indicates a location in a reference picture in L0 (i.e., an L0 reference picture) and the L1 motion vector indicates a location in a reference picture in L1 (i.e., an L1 reference picture). To determine the L0 motion vector and the L1 motion vector using AMVP, the video coder determines a L0 AMVP candidate list and a L1 AMVP candidate list. Each of the L0 AMVP candidate list and the L1 AMVP candidate list is limited to two candidates. Each of the candidates in the L0 AMVP candidate list and L1 AMVP candidate list is a motion vector. A L0 motion vector predictor (MVP) flag is signaled in a bitstream and indicates a candidate in the L0 AMVP candidate. A L1 MVP flag is signaled in the bitstream and indicates a candidate in the L1 AMVP candidate. Furthermore, an L0 reference index and/or an L1 reference index may be signaled to indicate the L0 reference picture in L0 and/or the L1 reference picture in L1.

When encoding the current block using AMVP, a video encoder may perform a search process to determine a L0 motion vector difference (MVD) and a L1 MVD. The L0 MVD indicates a difference between a final L0 motion vector and a selected candidate in the L0 AMVP candidate list. The L1 MVD indicates a difference between a final L1 motion vector and a selected candidate in the L1 AMVP candidate list. The video encoder may signal the L0 MVD and the L1 MVD in the bitstream. A video decoder may determine the selected candidates from the L0 AMVP candidate list and the L1 AMVP candidate list based on the L0 MVP flag and the L1 MVP flag. The video decoder may then add the L0 MVD to the selected candidate in the L0 AMVP candidate list and may add the L1 MVD to the selected candidate in the L1 AMVP candidate list. The video decoder may then use the resulting motion vectors to determine a prediction block for the current block based on samples of the indicated L0 and/or L1 reference pictures.

Symmetric MVD (SMVD) is a version of AMVP in which neither the reference picture indices nor the L1 MVD is signaled. Rather, when using SMVD, a video decoder may derive the reference picture indices and the L1 MVD. Specifically, the video decoder may determine that the L0 and L1 reference pictures are the nearest (in terms of picture order count (POC) distance) reference pictures in L0 and L1, respectively, to the current picture when the nearest reference pictures in L0 and L1 form a forward and backward pair or a backward and forward pair. The video coder may determine the L1 MVD as the negative of the signaled L0 MVD. Thus, use of SMVD may improve coding efficiency for some blocks because the bitstream does not need to include the L0 reference picture index, the L1 reference picture index, or the L1 MVD for such blocks.

As described in this disclosure, a video coder may apply DMVR in the context of AMVP and SMVD. For instance, in one example, this disclosure describes a video coder that forms, in a symmetric motion vector difference mode, a L0 base vector using a L0 AMVP candidate list and a L1 base vector using a L1 AMVP candidate list. Furthermore, the video coder may determine a refined L0 motion vector and a refined L1 motion vector by performing a DMVR process that refines the L0 base vector and the L1 base vector. The video coder may use the refined L0 motion vector and the refined L1 motion vector to determine a prediction block for a current block of a current picture of the video data. In some examples, video encoders and video decoders implementing this example may achieve increased coding efficiency and/or increased video quality because signaling of the L0 reference index, the L1 reference index, and the L1 MVD may be avoided while still allowing some differences between the final L0 motion vector and the L1 motion vector by operation of the DMVR process.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may include any of a wide range of devices, including desktop computers, mobile devices (e.g., notebook (i.e., laptop) computers, tablet computers, telephone handsets such smartphones, cameras, or other types of devices configured to support wireless communication), set-top boxes, televisions, display devices, digital media players, broadcast receiver devices, mobile devices (including video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for applying inter modes with weighting-averaged prediction, symmetric motion vector difference (MVD) or affine motion. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for applying inter modes with weighting-averaged prediction, symmetric motion vector difference (MVD) or affine motion. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between source device 102 and destination device 116, e.g., for video streaming, video playback, video broadcasting, or video telephony.

In general, video source 104 represents a source of video data (e.g., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. The latest HEVC draft specification, and referred to as HEVC WD hereinafter, is available from http://phenix.int-evry.fr/jct/doc_end_user/documents/14_Vienna/wg11/JCTVC-N1003-v34.zip. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14$^{th}$ Meeting: Geneva, CH, 19-27 Mar. 2019, JVET-N1001-v8 (hereinafter "VVC Draft 5"). Chen et al., "Algorithm description of Versatile Video Coding and Test Model 5 (VTM 5)," Joint Video Experts Team (JVET) of ITU-T SG 16 WP 3 and ISO/IEC JTC 1/SC 29/WG 11, 14$^{th}$ Meeting: Geneva, CH, 19-27 Mar. 2019, document JVET-N1002-v2, is an algorithm description for VVC, which this disclosure may refer to as JVET-N1002. The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and/or video decoder 300 may perform any combination of the techniques set forth in this disclosure. For instance, in one example, a video coder (e.g., video encoder 200 or video decoder 300) may form, in a symmetric motion vector difference mode, a L0 base vector using a L0 AMVP candidate list and a L1 base vector using a L1 AMVP candidate list. Furthermore, the video coder may determine a refined L0 motion vector and a refined L1 motion vector by performing a decoder-side motion vector refinement process that refines the L0 base vector and the L1 base vector. In this example, the video coder may use the refined L0 motion vector and the refined L1 motion vector to determine a prediction block for a current block of a current picture of the video data. The video coder may reconstruct the current block based on the prediction block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
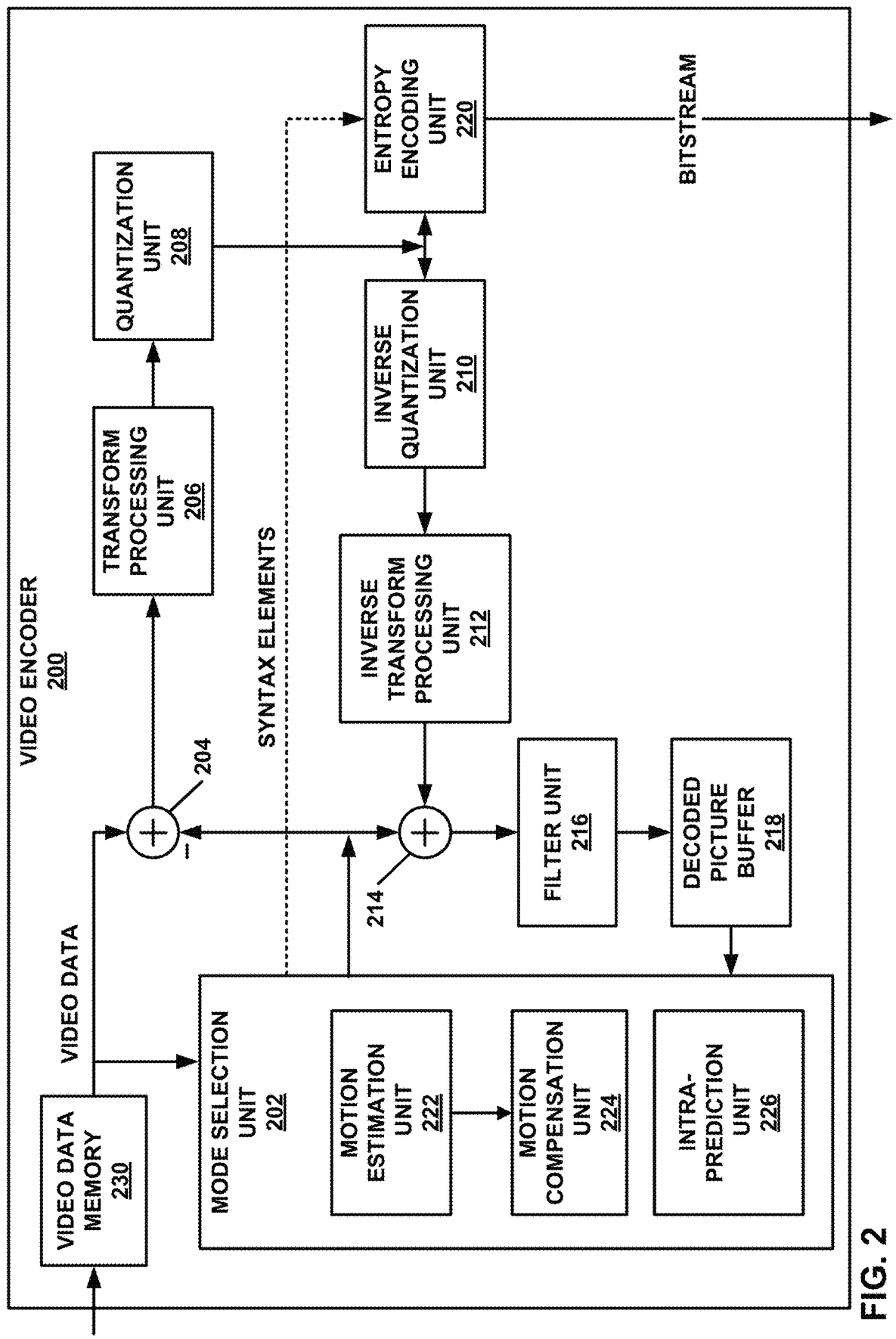
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

In accordance with a technique of this disclosure, motion estimation unit 222 may form, in a symmetric motion vector difference mode, a L0 base vector using a L0 AMVP candidate list and a L1 base vector using a L1 AMVP candidate list. Furthermore, motion estimation unit 22 may determine a refined L0 motion vector and a refined L1 motion vector by performing a decoder-side motion vector refinement process that refines the L0 base vector and the L1 base vector. Motion compensation unit 224 may use the refined L0 motion vector and the refined L1 motion vector to determine a prediction block for a current block of a current picture of the video data.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to perform any combination of the techniques set forth in this disclosure.

Figure 3:
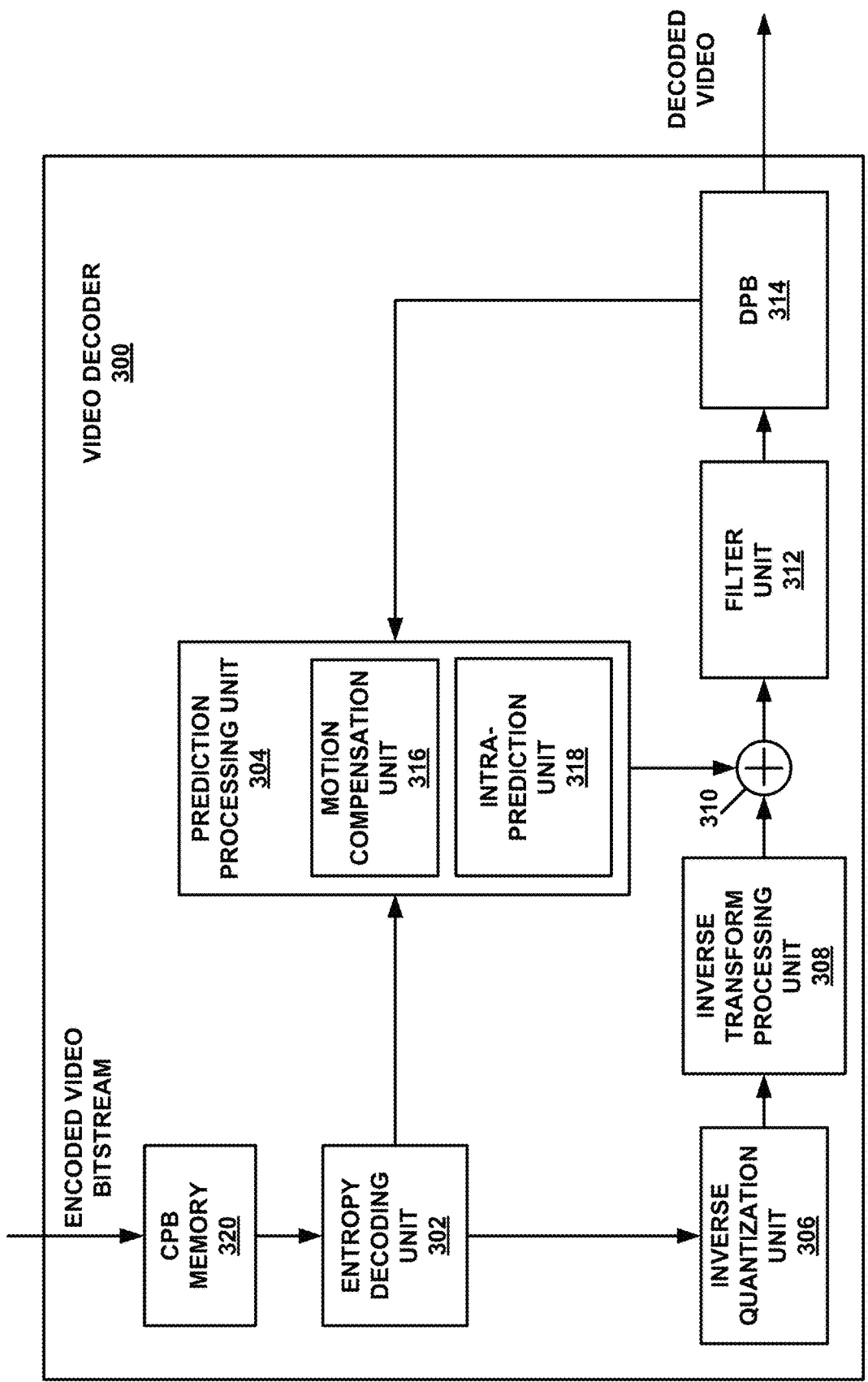
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC, and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

Motion compensation unit 316 may form, in a symmetric motion vector difference mode, a L0 base vector using a L0 AMVP candidate list and a L1 base vector using a L1 AMVP candidate list. Furthermore, motion compensation unit 316 may determine a refined L0 motion vector and a refined L1 motion vector by performing a decoder-side motion vector refinement process that refines the L0 base vector and the L1 base vector. Motion compensation unit 316 may use the refined L0 motion vector and the refined L1 motion vector to determine a prediction block for a current block of a current picture of the video data.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processing units implemented in circuitry and configured to perform any combination of the techniques set forth in this disclosure. For instance, video decoder 300 may represent an example of a video decoding device that includes a memory configured to store video data and one or more processing units implemented in circuitry and configured to form, in a symmetric motion vector difference mode, a L0 base vector using a L0 AMVP candidate list and a L1 base vector using a L1 AMVP candidate list; determine a refined L0 motion vector and a refined L1 motion vector by performing a decoder-side motion vector refinement process that refines the L0 base vector and the L1 base vector; use the refined L0 motion vector and the refined L1 motion vector to determine a prediction block for a current block of a current picture of the video data; and reconstruct the current block based on the prediction block.

In HEVC, the largest coding unit in a slice is called a coding tree block (CTB) or coding tree unit (CTU). A CTB contains a quad-tree the nodes of which are coding units. The size of a CTB can be ranges from 16×16 to 64×64 in the HEVC main profile (although technically 8×8 CTB sizes can be supported). A coding unit (CU) could be the same size of a CTB to as small as 8×8. Each coding unit is coded with one mode, i.e. inter or intra. When a CU is inter coded, the CU may be further partitioned into 2 or 4 prediction units (PUs) or become just one PU when further partition does not apply. When two PUs are present in one CU, they can be half size rectangles or two rectangle size with ¼ or ¾ size of the CU. When the CU is inter coded, each PU has one set of motion information, which is derived with a unique inter prediction mode.

In the HEVC standard, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list.

In HEVC, the MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures used for the prediction of the current blocks, as well as the associated motion vectors are determined. On the other hand, under AMVP mode for each potential prediction direction from either list 0 or list 1, a reference index may be explicitly signaled, together with an MV predictor (MVP) index to the MV candidate list since the AMVP candidate contains only a motion vector. In AMVP mode, the predicted motion vectors can be further refined. The candidates for both modes are derived similarly from the same spatial and temporal neighboring blocks.

Figure 5:
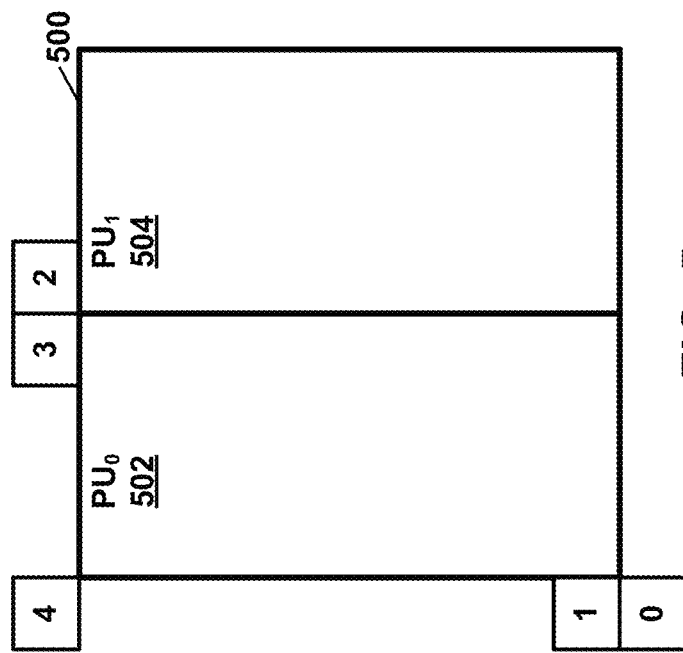
FIG. 5 is a conceptual diagram illustrating spatial neighboring motion vector (MV) candidates for Advanced Motion Vector Prediction (AMVP) mode.
Figure 4:
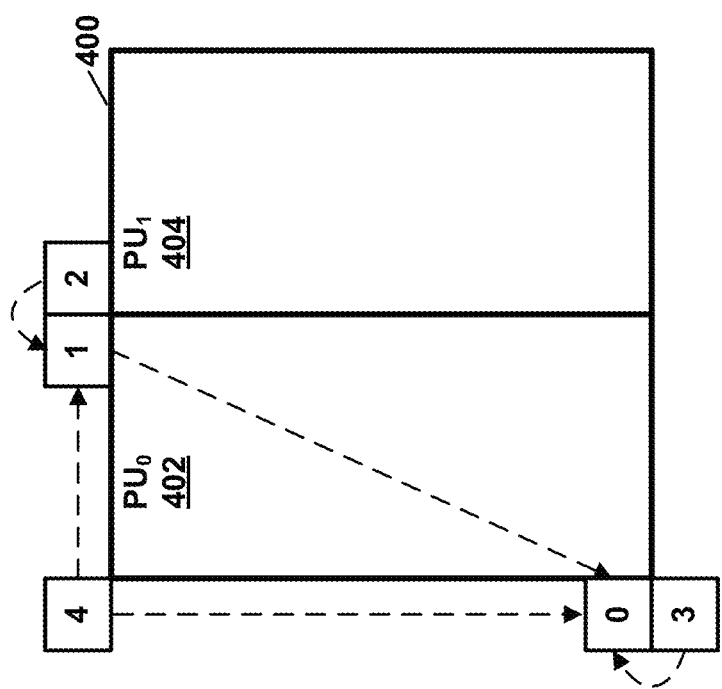
FIG. 4 is a conceptual diagram illustrating spatial neighboring motion vector (MV) candidates for merge mode.

FIG. 4 is a conceptual diagram illustrating spatial neighboring MV candidates for merge mode. FIG. 5 is a conceptual diagram illustrating spatial neighboring MV candidates for AMVP mode. In the example of FIG. 4, a CU 400 includes a first PU 402 (denoted $PU_0$) and a second PU 404 (denoted $PU_1$). In the example of FIG. 5, a CU 500 includes a first PU 502 (denoted $PU_0$) and a second PU 504 (denoted $PU_1$). Spatial MV candidates are derived from the neighboring blocks shown in FIG. 4 and FIG. 5, 1, for a specific PU 402, 505 ($PU_0$), although the methods generating the candidates from the blocks differ for merge and AMVP modes. In merge mode, up to four spatial MV candidates can be derived for PU 402 with the orders shown in FIG. 4 with numbers, and the order is the following: left (0, A1), above (1, B1), above right (2, B0), below left (3, A0), and above left (4, B2), as shown in FIG. 4.

In AMVP mode, the neighboring blocks of PU 502 are divided into two groups: a left group consisting of the block 0 and 1, and an above group consisting of the blocks 2, 3, and 4 as shown in FIG. 5. For each group, the potential candidate in a neighboring block referring to the same reference picture as that indicated by the signaled reference index has the highest priority to be chosen to form a final candidate of the group. It is possible that one or more or all of the neighboring blocks do not contain a motion vector pointing to the same reference picture. Therefore, if such a candidate cannot be found, the first available candidate will be scaled to form the final candidate, thus the temporal distance differences can be compensated.

A temporal motion vector predictor (TMVP) candidate, if enabled and available, may be added, by a video coder (e.g., video encoder 200 or video decoder 300), into a MV candidate list, such as a merge candidate list or an AMVP candidate list, after spatial motion vector candidates. The process of motion vector derivation for TMVP candidate may be the same for both merge and AMVP modes. However, the target reference index for the TMVP candidate in the merge mode is always set to 0.

Figure 6:
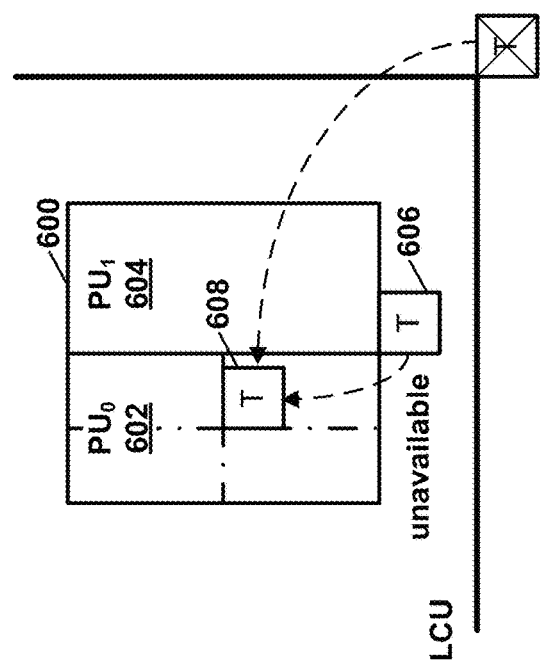
FIG. 6 is a conceptual diagram illustrating a temporal motion vector predictor (TMVP) candidate.

FIG. 6 is a conceptual diagram illustrating a TMVP candidate. In the example of FIG. 6, a CU 600 includes a first PU 602 (denoted $PU_0$) and a second PU 604 (denoted $PU_1$). In the example of FIG. 6, a primary block location 606 for TMVP candidate derivation is the bottom right block outside of the collocated PU (shown in FIG. 6 as a block "T"), to compensate for the bias to the above and left blocks used to generate spatial neighboring candidates. However, if the block at primary block location 608 is located outside of a current CTB row or motion information is not available, the block is substituted with a center block 608 of PU 602. A motion vector for a TMVP candidate is derived from the co-located PU of the co-located picture, indicated in the slice level. The motion vector for the co-located PU is called collocated MV. Similar to temporal direct mode in AVC, to derive the TMVP candidate motion vector, the co-located MV may need to be scaled to compensate for the temporal distance differences, as shown in FIG. 7.

Figure 7:
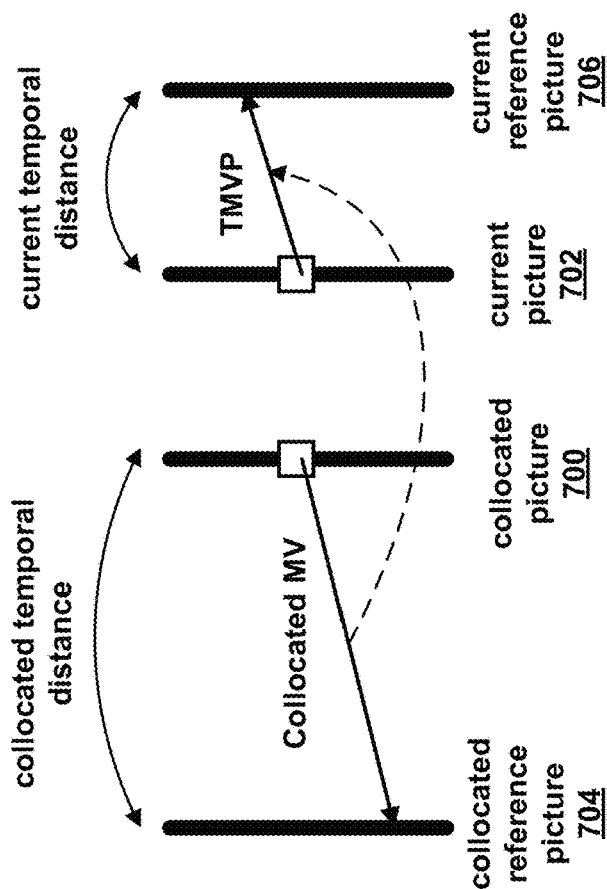
FIG. 7 is a conceptual diagram illustrating motion vector (MV) scaling.

FIG. 7 is a conceptual diagram illustrating MV scaling. In the example of FIG. 7, a collocated picture 700 for a current picture 702 includes a motion vector (i.e., a collocated motion vector) that indicates a location in a collocated reference picture 704. A temporal distance between collocated picture 700 and collocated reference picture 704 is referred to as the collocated temporal distance. Furthermore, in AMVP, a reference index for a current block of current picture 702 indicates a current reference picture 706. A temporal distance between current picture 702 and current reference picture 706 is referred to as a current temporal distance. A video coder may use collocated motion vector as a temporal motion vector predictor (TMVP) of the block in current picture 702 but may scale the collocated motion vector based on a difference between the collocated temporal distance and the current temporal distance.

Thus, to determine a L0 AMVP candidate list, the video coder may determine whether there is an available neighboring block in the left group that has a L0 motion vector. A neighboring block may be considered available if the neighboring block exists and the video coder is able to access motion information regarding the neighboring block. Furthermore, if the left group includes an available neighboring block that has a L0 motion vector, the video coder may include the L0 motion vector in the L0 AMVP candidate list. Additionally, the video coder may determine whether there is an available neighboring block in the above group that has a L0 motion vector. If the above group includes an available neighboring block that has a L0 motion vector, the video coder may include the L0 motion vector in the L0 AMVP candidate list. In some examples, if the left group and/or the above group includes no available L0 motion vectors, the video coder may include a L0 motion vector of a temporal neighbor. In some such examples, if the temporal neighbor is not available or does not have an L0 motion vector, the video coder may include a zero-valued motion vector in the L0 AMVP candidate list. The video coder may perform the same process with L0 replaced with L1 to determine a L1 AMVP candidate list.

Several aspects of merge and AMVP modes are mentioned below:

Motion vector scaling: It is assumed that the values of motion vectors are proportional to the distance of pictures in the presentation time. A motion vector associates two pictures: (1) the reference picture, and (2) the picture containing the motion vector (namely, the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance, based on POC, is calculated. The motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial motion vector candidate generation: If a motion vector candidate list (e.g., a merge candidate list or an AMVP candidate list) is not complete, artificial motion vector candidates are generated by a video coder and inserted at the end of the list until it will have all candidates. In merge mode, there are two types of artificial MV candidates: (1) combined candidate derived only for B-slices, and (2) zero candidates that used only for AMVP if the first type does not provide enough artificial candidates. The term "zero candidate" refers to a candidate with a motion vector of 0 magnitude.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Pruning process for candidate insertion: Candidates from different blocks may happen to be the same, which decreases the efficiency of a merge candidate list or an AMVP candidate list. A pruning process is applied to solve this problem. It compares one candidate against the others in the current candidate list to avoid inserting identical candidate in certain extent. To reduce the complexity, only limited numbers of candidate comparisons are performed in the pruning process instead of comparing each candidate with all the other existing candidates.

Triangle Partition Merge (TPM) mode: TPM is a type of merge mode that splits a coding unit equally into two triangle-shaped partitions, using either diagonal (FIG. 8) or anti-diagonal split (FIG. 9). That is, in the example of FIG. 8, a block 800 is split into partition 1 (802) and partition 2 (804) using a diagonal split. In the example of FIG. 9, a block 900 is split into partition 1 (902) and partition 2 (904) using an anti-diagonal split. Each triangle partition in the CU is inter-predicted using its own motion. Only uni-prediction is allowed for each partition. That is, each partition has one motion vector and one reference index. The MV and reference index of each partition are inferred through sampling the motion information from merge list. If TPM is used for a CU, then a flag indicating the direction of the triangle partition (diagonal or anti-diagonal) and two merge indices (one for each partition) are further signaled.

Figure 10:
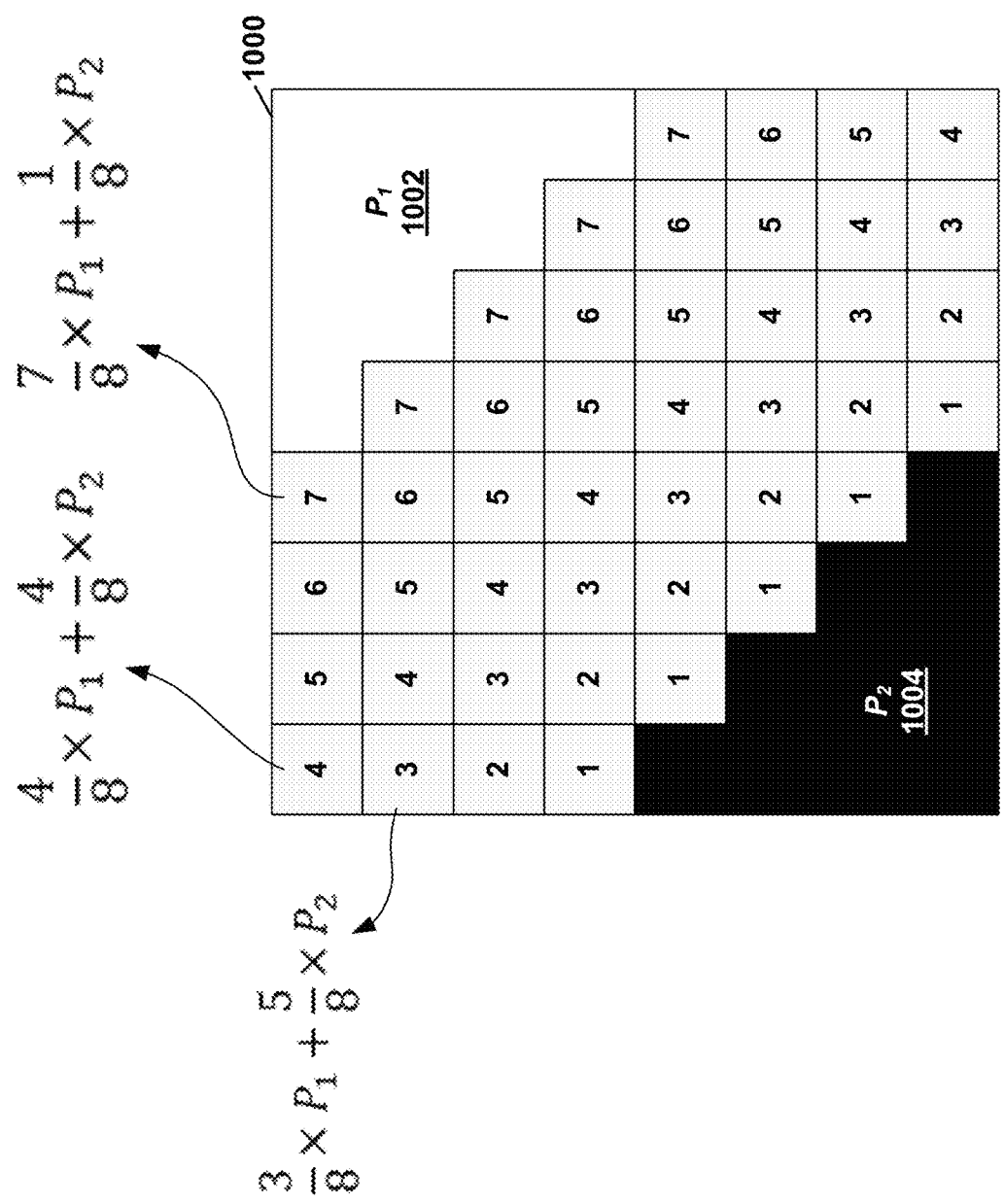
FIG. 10 is a conceptual diagram illustrating sample-based weighting values used in triangle partition merge (TPM) mode.

After the motion information of each triangle partition is inferred and uni-directional motion compensation is performed, a weighted-averaging operation (FIG. 10) is applied by a video coder to blend the prediction signals of the two triangle partitions to form the resulting signals of motion compensation. FIG. 10 is a conceptual diagram illustrating sample-based weighting values used in triangle partition merge (TPM) mode. As shown in FIG. 10, the weighted-averaging operation takes place along the boundary between two partitions 1002, 1004 inside a luma block 1000 of a CU and along the boundary between two partitions 1006, 1008 for a chroma block 1010 of the CU. The following weights are used in the blending process:

{7/8, 6/8, 5/8, 4/8, 3/8, 2/8, 1/8} for luma;
{6/8, 4/8, 2/8} for chroma.

Combined Intra-Inter Prediction (CIIP): CIIP is another coding tool for generating a prediction block. CIIP combines an inter prediction signal with an intra prediction signal in a weighted-averaging manner. The inter prediction signal in the CIIP mode (i.e., $P_{inter}$) is derived using the same inter prediction process applied to regular merge mode; and the intra prediction signal (i.e., $P_{intra}$) is derived following the regular intra prediction process with the planar mode. Then, the intra and inter prediction signals are combined using weighted averaging, where the weight value is calculated depending on the coding modes of the top and left neighboring blocks (depicted in FIG. 11) as follows:

If the top neighbor is available and intra coded, then set isIntraTop to 1, otherwise set isIntraTop to 0;

If the left neighbor is available and intra coded, then set isIntraLeft to 1, otherwise set isIntraLeft to 0;

If (isIntraLeft+isIntraLeft) is equal to 2, then wt is set to 3;

Otherwise, if (isIntraLeft+isIntraLeft) is equal to 1, then wt is set to 2;

Otherwise, set wt to 1.

Figure 11:
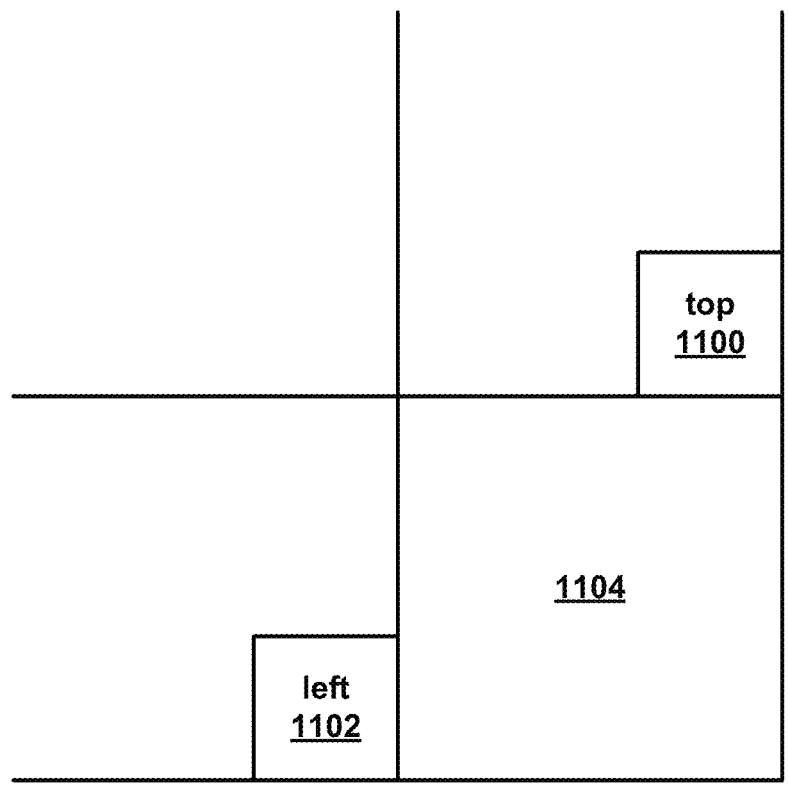
FIG. 11 is a conceptual diagram illustrating top and left neighboring blocks used in Combined Intra and Inter Prediction (CIIP) weight derivation.

The CIIP prediction is formed as $P_{CIIP}=((4-wt)*P_{inter}+wt*P_{intra}+2)>>2$. A CU-level flag is used to indicate the use of CIIP mode. FIG. 11 is a conceptual diagram illustrating top and left neighboring blocks 1100, 1102 used in CIIP weight derivation for a current block 1104.

Merge mode with motion vector difference (MMVD): MMVD is a merge mode that allows signaling of an additional motion vector difference explicitly to refine the motion field of merge mode. An MMVD flag is signaled immediately after sending a skip flag, merge flag, and regular merge flag. The MMVD flag indicates whether the MMVD mode is used for a CU. In MMVD, after a merge candidate is selected, the merge candidate is further refined by the signaled MVD's information. Further information includes a merge candidate flag, an index to specify motion magnitude, and an index for indication of motion direction. In MMVD mode, one of the first two candidates in the merge candidate list is selected to be used as MV basis. The merge candidate flag is signaled to specify which one of the first 2 candidates in the merge candidate list is used.

The distance index specifies motion magnitude information and indicates the pre-defined offset from the starting point. FIG. 12 is a conceptual diagram that illustrates MMVD search points. As shown in FIG. 12, an offset is added to either a horizontal component or a vertical component of a starting MV. The relation of a distance index and a pre-defined offset may be defined as $2^{idx-2}$, where idx is an integer ranging from 0 to 7. Specifically, the example of FIG. 12 shows an area of an L0 reference picture 1200 and an area of an L1 reference picture 1202. Circles in L0 reference picture 1200 and L1 reference picture 1202 correspond to potential offsets that may be added to the horizontal or vertical components of a starting MV that points into L0 reference picture 1200 or L1 reference picture 1202.

A direction index represents the direction of the MVD relative to the starting point. The direction index can represent one of the four directions, as shown in the below table, where 00, 01, 10 and 11 denote right, left, up and down, respectively. The meaning of an MVD sign may be variant according to the information of the starting MVs. When the starting MVs is a uni-prediction MV or bi-prediction MVs with both lists point to the same side of the current picture (i.e., POCs of two references are both larger than the POC of the current picture, or are both smaller than the POC of the current picture), the sign in the table below specifies the sign of an MV offset added to the starting MV. When the starting MVs is bi-prediction, MVs with the two MVs point to the different sides of the current picture (i.e., the POC of one reference is larger than the POC of the current picture, and the POC of the other reference is smaller than the POC of the current picture), the sign in the table below specifies the sign of MV offset added to the L0 MV component of starting MV and the sign for the L1 MV has the opposite value.

| Direction IDX | 00 | 01 | 10 | 11 |
| --- | --- | --- | --- | --- |
| x-axis | + | − | N/A | N/A |
| y-axis | N/A | N/A | + | − |

Symmetric MVD coding: In the symmetric MVD mode (SMVD), specific motion information, including reference picture indices of both L0 and L1 (i.e., a L0 reference picture index and a L1 reference picture index) and MVD of L1 (i.e., a L1 MVD), is not signaled but is instead derived. The decoding process of SMVD may be described as follows:

1. At the slice level, variables BiDirPredFlag, RefIdxSymL0 and RefIdxSymL1 are derived as follows:

If mvd_l1_zero_flag is 1, BiDirPredFlag is set equal to 0.

Otherwise, if the nearest reference picture in list 0 (i.e., L0) and the nearest reference picture in list 1 (i.e., L1) form a forward and backward pair of reference pictures or a backward and forward pair of reference pictures, BiDirPredFlag is set to 1. Otherwise, BiDirPredFlag is set to 0.

2. At the CU level, a symmetrical mode flag indicating whether or not the symmetrical mode is used is explicitly signaled if the CU is bi-prediction coded (i.e., bi-directionally inter predicted) and BiDirPredFlag is equal to 1.

A forward and backward pair of reference pictures is a set of two reference pictures, the first of which occurs before the current picture in display order and the second of which occurs after the current picture in display order. Similarly, a backward and forward pair of reference pictures is a set of two reference pictures, the first of which occurs after the current picture in display order and the second of which occurs before the current picture in display order.

When the symmetrical mode flag is true, only mvp_l0_flag, mvp_l1_flag and MVD0 are explicitly signaled. The reference indices for L0 and L1 are set equal to the pair of reference pictures, respectively. MVD1 is set equal to (−MVD0). The final motion vectors are shown in formula below.

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases}$$

Figure 13:
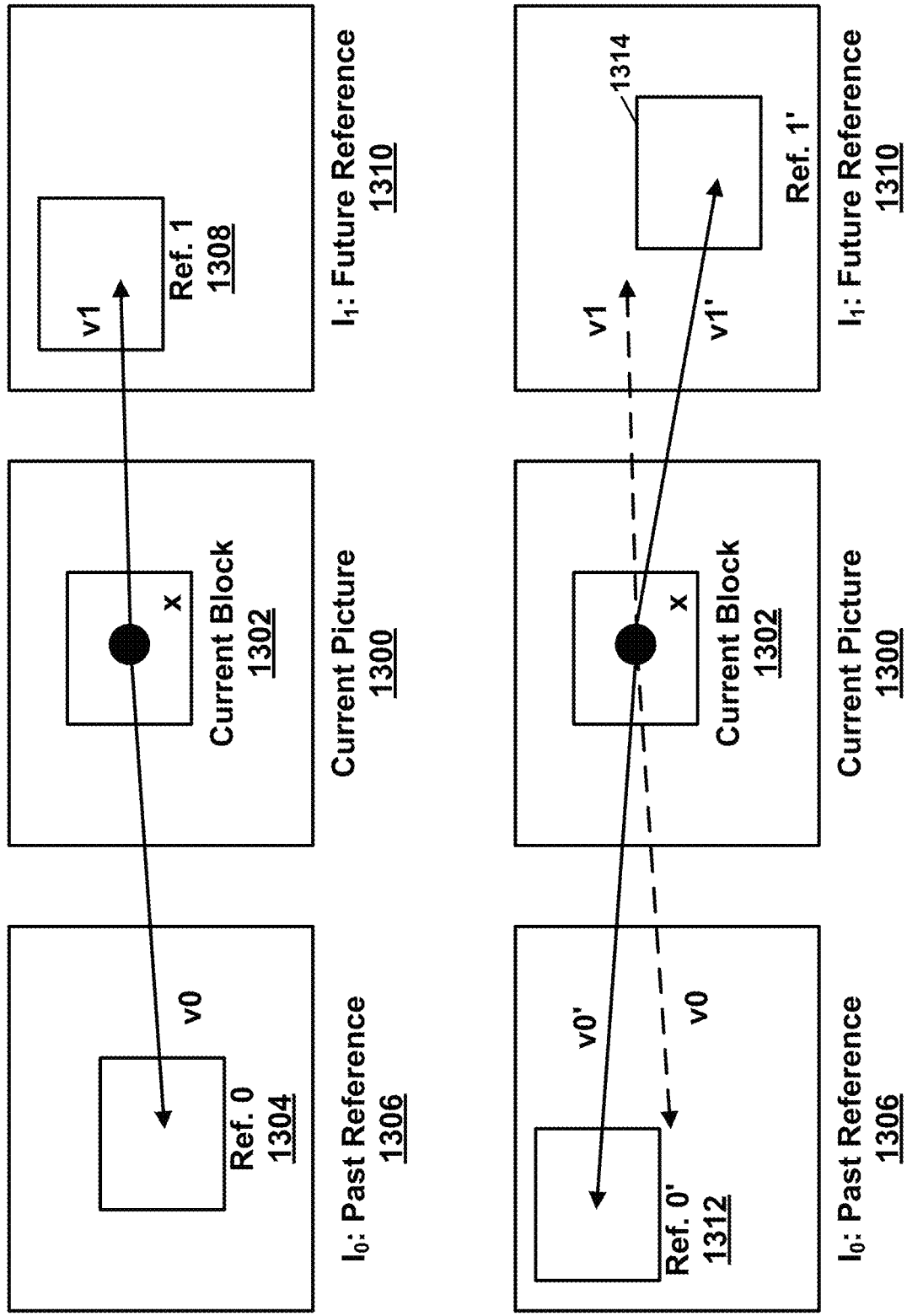
FIG. 13 is a conceptual diagram that illustrates bilateral template matching.

Decoder-side motion vector refinement (DMVR): DMVR is a decoder-side MV derivation technique that computes the bilateral matching cost directly between the two uni-prediction reference blocks (denoted as $I_0(x+v_0)$ and $I_1(x+v_1)$ and x as the coordinate of a pixel within the current block) pointed to by the initial bi-prediction MVs (e.g. $v_0$ and $v_1$ as in FIG. 13). FIG. 13 is a conceptual diagram that illustrates bilateral template matching. In the example of FIG. 13, a current picture 1300 includes a current block 1302. Current block 1302 has an L0 motion vector that indicates a location corresponding to an area 1304 (denoted Ref. 0) in a past reference picture 1306. Current block 1302 also has an L1 motion vector that indicates a location corresponding to an area 1308 in a future reference picture 1310. A video coder performs a local search based on bilateral matching within a pre-defined 5×5 search range around the initial bi-prediction MVs. Following the raster-scanning order from the top-left of the 5×5 window, DMVR finds an optimal delta MV (i.e. Δ). The optimal delta MV is a delta MV that leads to the lowest bilateral matching cost, where the cost function is defined as the distortion between $I_0(x+v_0+\Delta)$ and $I_1(x+v_1-\Delta)$. A delta MV is tuple that includes x and y values that are added to or subtracted from x and y values of the bi-prediction MVs. The optimal delta MV may be denoted by Δ*. The distortion function that is used in the current VVC standard is Sum of Absolute Difference.

The video coder may then refine the output MV pair (denoted as $v_0+\Delta^*$ and $v_1-\Delta^*$, wherein Δ* is the optimized Δ within the pre-defined 5×5 window) again at sub-pel precision. The video coder may take the resulting MV pair to replace the original MVs) ($v_0^{(0)}$ and $v_1^{(0)}$) of the merge block. The video coder may then motion compensation based on the refined MVs. Thus, in the example of FIG. 13, the video coder may determine areas 1312 and 1314 corresponding to locations Ref0' and Ref1' indicated by the refined MV pair.

Figure 14:
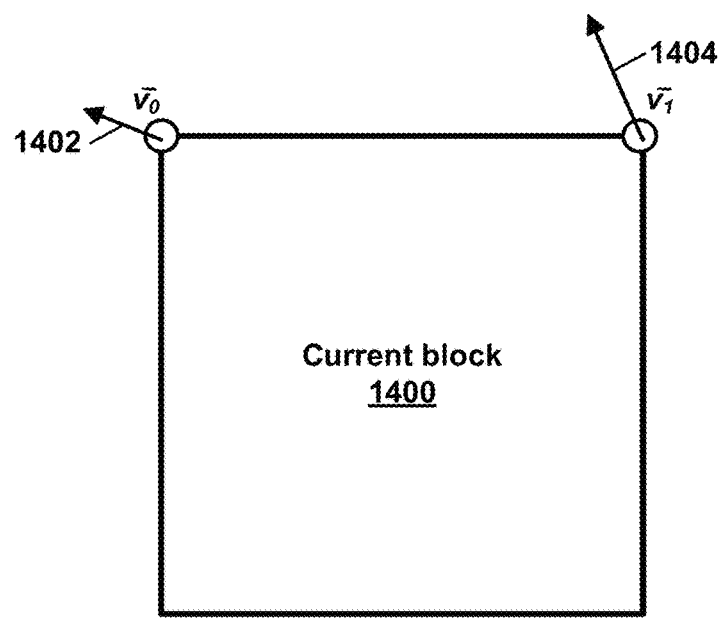
FIG. 14 is a conceptual diagram illustrating a 4-parameter affine motion model.
Figure 15:
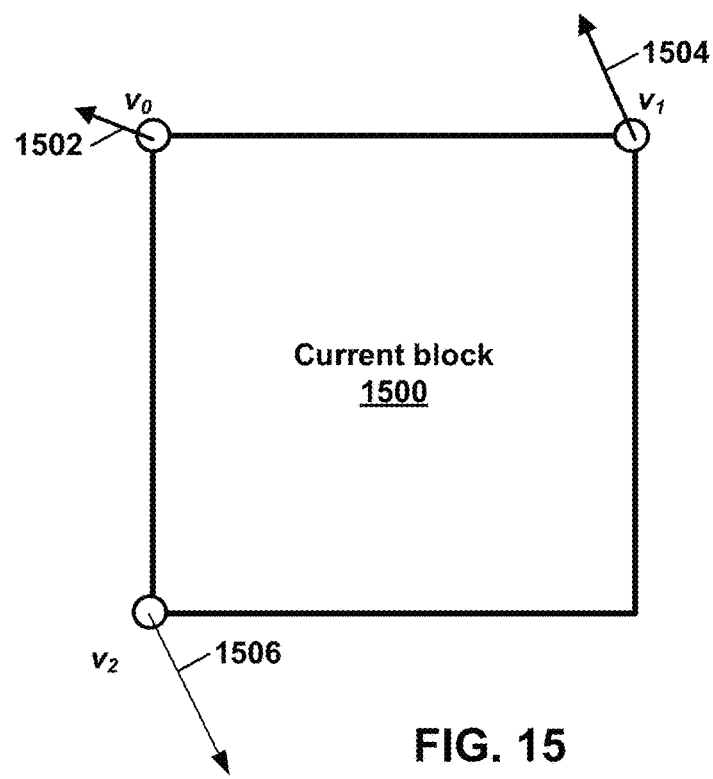
FIG. 15 is a conceptual diagram illustrating a 6-parameter affine motion model.

Affine motion compensated prediction: In VTM5, a video coder may apply a block-based affine transform motion compensation prediction. As shown in FIG. 14 and FIG. 15, an affine motion field of a current block 1400, 1500 may be described by motion information of two control point motion vectors 1402, 1404 (4-parameter or 4-p) (FIG. 14) or three control point motion vectors (6-parameter or 6-p) 1502, 1504, 1506 (FIG. 15). In FIG. 14, the two control point motion vectors 1402, 1404 are denoted as $\vec{v}_0$ and $\vec{v}_1$. In FIG. 15, the three control point motion vectors 1502, 1504, 1506 are denoted as $\vec{v}_0$, $\vec{v}_2$, and $\vec{v}_3$. In the context of affine motion compensated prediction, a "parameter" refers to an x- or y-component of a control point motion vector.

For a 4-parameter affine motion model, a video coder may derive a motion vector for a sample location (x, y) in a block as:

$$\begin{cases} mv_x = \frac{mv_{1x} - mv_{0x}}{W}x + \frac{mv_{1y} - mv_{0y}}{W}y + mv_{0x} \\ mv_y = \frac{mv_{1y} - mv_{0y}}{W}x + \frac{mv_{1y} - mv_{0x}}{W}y + mv_{0y} \end{cases}$$

For a 6-parameter affine motion model, a video coder may derive a motion vector for a sample location (x, y) in a block as:

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases}.$$

In these equations, $(mv_{0x}, mv_{0y})$ is the MV of the top-left corner control point (also called as top-left control point motion vector (CPMV)), $(mv_{1x}, mv_{1y})$ is the top-right CPMV, and $(mv_{2x}, mv_{2y})$ is the bottom-left CPMV.

To avoid per-sample motion compensation, a video coder, when using affine mode, derives the MV of a central sample within each 4×4 luma sub-block based on the 4-p model or 6-p model. The video coder may then perform motion compensation at the 4×4 sub-block level based on the derived MVs. As done for translational motion inter prediction, there are also two affine motion inter prediction modes: affine merge mode and affine AMVP mode.

Affine merge mode: A video coder may generate the CPMVs of the current CU based on the motion information of the spatial neighboring CUs. The affine merge list includes up to 5 control point motion vector predictor (CPMVP) candidates, selected by using an index value, which can be categorized into three types: (a) inherited candidates, (b) constructed candidates and (c) zero vector for CPMVs.

Figure 16:
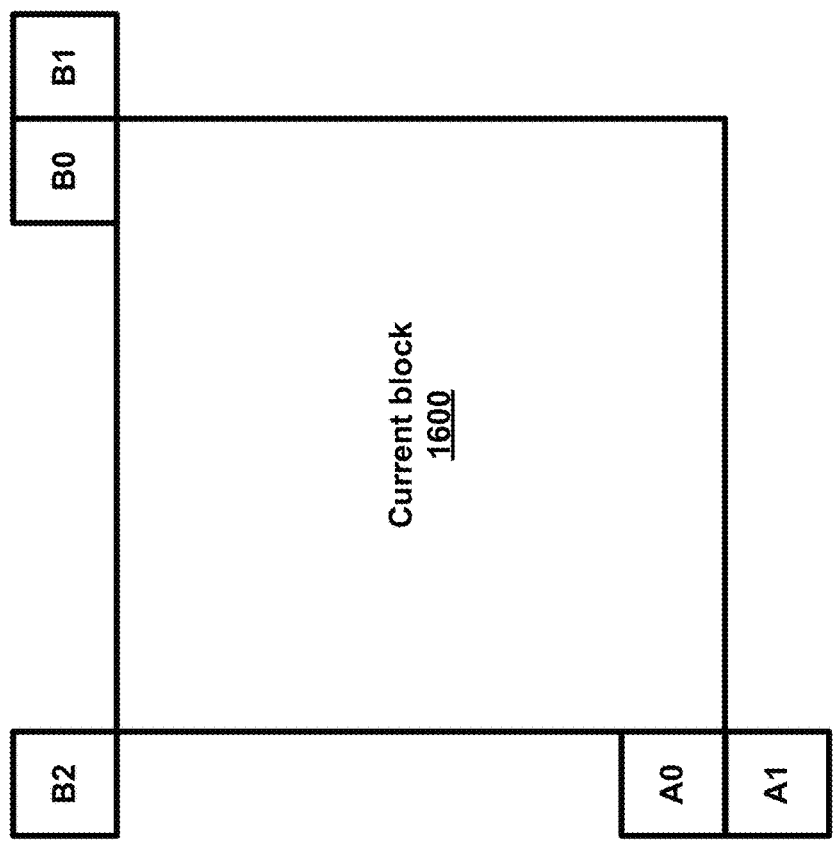
FIG. 16 is a conceptual diagram illustrating locations of inherited affine motion predictors.

In VVC Draft 5, there are at most 2 inherited affine candidates derived from an affine motion model of causal neighboring blocks (if the causal neighbor blocks are affine CUs), one from a first available CU to the left (i.e., A0→A1) of a current block 1600 and the other from the first available CU to be above (i.e., B0→B1→B2) the current block 1600 as depicted in FIG. 16. FIG. 16 is a conceptual diagram illustrating locations of inherited affine motion predictors. A causal neighbor block is a neighbor block decoded prior to a current block in a decoding order. When a neighboring affine CU is found available, the video coder uses CPMVs of the neighboring affine CU to derive the CPMVs for the current CU based on 4-p or 6-p model. The video coder may then insert the derived CPMVs into the affine merge list as a candidate for selection.

Figure 17:
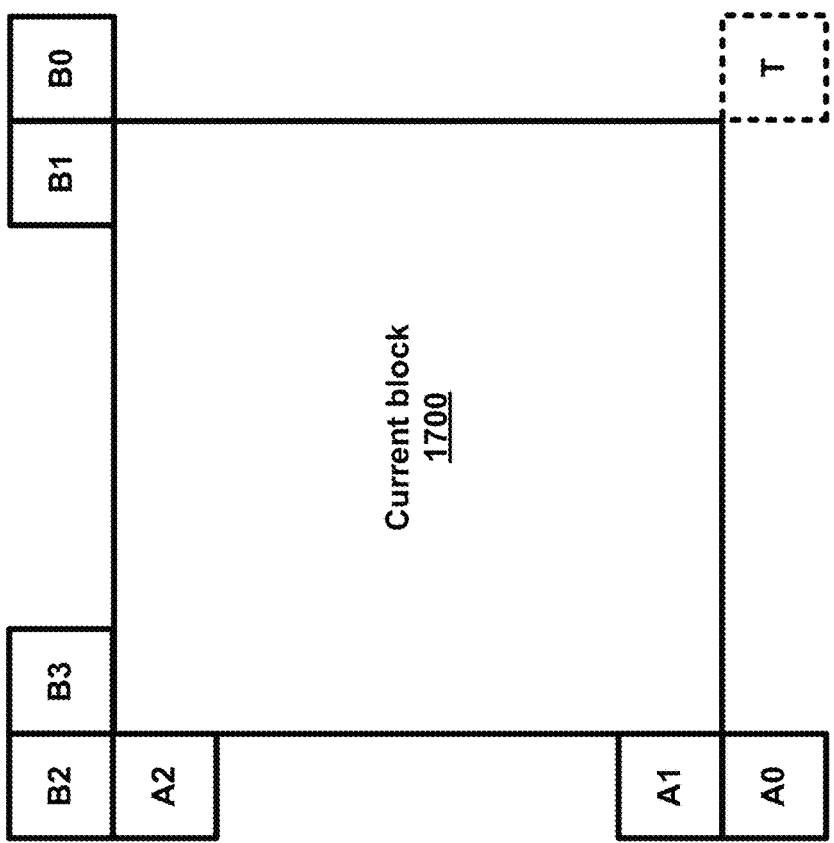
FIG. 17 is a conceptual diagram illustrating locations of sampling positions of constructed affine merge mode.

As noted above, the CPMVP candidates may include constructed candidates. A video coder may construct a constructed candidate by combining the neighbor translational motion information of each control point. The motion information for the control points is derived from the specified spatial neighbors and temporal neighbor of a current block 1700 as shown in FIG. 17. $CPMV_k$ (k=1, 2, 3, 4) represents the k-th control point. For $CPMV_1$, the B2→B3→A2 blocks are checked and the MV of the first available block is used. For $CPMV_2$, the B1→B0 blocks are checked and for $CPMV_3$, the A1→A0 blocks are checked. For TMVP is used as $CPMV_4$ if TMVP is available. After MVs of four control points are attained, the video coder constructs affine merge candidates based on the motion information of the four control points. The video coder may construct the following combinations of control point MVs in the following order: {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}. The combination of three CPMVs constructs a 6-parameter affine merge candidate and the combination of two CPMVs constructs a 4-parameter affine merge candidate. To avoid performing a motion scaling process, if the reference indices of control points are different, the video coder may discard the related combination of control point MVs.

Furthermore, as noted above, the CPMVP candidates may include zero-vector CPMVs. A zero-vector CPMV is a CPMV with zero magnitude. After the video coder checks inherited affine merge candidates and constructed affine merge candidate(s), if the list of CPMVP candidates is still not full, the video coder may insert zero-vector MVs to the end of the list of CPMVP candidates.

Affine AMVP mode: In the affine AMVP mode, the difference of the CPMVs of the current CU and their predictors CPMVPs is signaled in the bitstream. In VVC Draft 5, the affine AMVP candidate list size is 2 and can be generated by using (a) inherited candidates, (b) constructed candidates (c) neighboring translational MVs, and (d) a zero vector for CPMVs.

The checking order of inherited affine AMVP candidates is the same as the checking order of inherited affine merge candidates. In VVC Draft 5, the only difference is that, for AMVP candidates, only affine CUs that have the same reference picture as the current block are considered.

In affine AMVP mode, a video coder derives a constructed AMVP candidate from the specified spatial neighbors shown in FIG. 17. The video coder uses the same checking order as affine merge candidate construction. In addition, the video coder also checks a reference picture index of the neighboring block. The first block in the checking order that is inter coded and that has the same reference picture as in the current CUs is used. When the current CU is coded with a 4-p model, and $v_0$ and $v_1$ are both available, the video coder adds $v_0$ and $v_1$ as one candidate in the affine AMVP candidate list. When the current CU is coded with a 6-p model and all three CPMVs are available, the video coder adds the three CPMVs as one candidate in the affine AMVP candidate list. Otherwise, the constructed AMVP candidate is set as unavailable.

If the number of affine AMVP list candidates in the affine AMVP candidate list is still less than 2 after inherited affine AMVP candidates and constructed AMVP candidate are checked, the video coder may add $\{v_0, v_1, v_2\}$, in order, as the translational MVs to predict all control point MVs of the current CU, when available. Finally, the video coder may use zero-vector MVs to fill the affine AMVP candidate list if the affine AMVP candidate list is still not full.

Triangle partition mode with simplified motion field storage and motion compensation: U.S. Provisional Patent Application 62/857,584, filed Jun. 5, 2019, described techniques that may reduce complexity of inter prediction by simplifying the storage of the triangle partition mode (TPM). U.S. Provisional Patent Application 62/857,584 described removing the bi-prediction motion vector for storage, to only store uni-prediction motion vectors in triangle prediction mode. In some examples, the storage of the bi-prediction motion vector is removed entirely, to only store the motion vector Mv1, as in P1. In some examples, the storage of the bi-prediction motion vector is removed entirely, to only store the motion vector Mv2, as in P2. In some examples, the storage of the bi-prediction motion vector is removed entirely, to store either Mv1 or Mv2, depending on the position inside the block (e.g., blocks in the upper half store Mv1 and lower half store Mv2). In some examples, the storage of the bi-prediction motion vector is removed entirely, to store either Mv1 or Mv2, depending on the split direction of the triangle (e.g., Mv1 is stored for 45° split and Mv2 is stored for 135° split). In some examples, the bi-prediction motion vector is removed depending on block size and the position within the block (e.g. only for the corner case of 4×N and N×4, and for the first and last PUs).

U.S. Provisional Patent Application 62/857,584 also described changing the generation algorithm for the bi-prediction motion vector to make the generation algorithm simpler. In some examples, when both Mv1 and Mv2 are from the same list, only Mv1 is stored. In other examples, when both Mv1 and Mv2 are from the same list, only Mv2 is stored. In still other examples, when both Mv1 and Mv2 are from the same list, either Mv1 or Mv2 is stored, depending on the position within the block (e.g. blocks in the upper half store Mv1 and lower half store Mv2). In some examples, when both Mv1 and Mv2 are from the same list, either Mv1 or Mv2 is stored, depending on the split direction of the triangle (e.g. Mv1 is stored for 45° split and Mv2 is stored for 135° split).

U.S. Provisional Patent Application 62/857,584 described that, in some examples, when bi-prediction merge candidates in the merge list are with non-0.5 bi-prediction with weights (BCW) weight values, their motion information corresponding to the reference picture list coupled with a lower weight value is not considered as valid TPM candidates. In BCW, predictions from different reference pictures are not weighted equally. Specifically, the motion information corresponding to a reference picture list Lx (where x is either 0 or 1) of a bi-prediction merge candidate is included in the TPM candidate list only when the following conditions are satisfied.

If the bi-prediction merge candidate is with a 0.5 BCW weight value, x is determined by the parity check process.

Otherwise, if the bi-prediction merge candidate is with a non-0.5 BCW weight value, x is determined by whichever is with a larger BCW weight value.

A sequence-, tile-group-, slice-, CTU-level flag may be introduced in the bitstream to indicate the usage of the aforementioned method.

Simplified blending method along triangle partition edge: U.S. Provisional Patent Application 62/857,584 described how the blending operation described above with respect to FIG. 10 applied to the 4×4 units along the boundary between two triangle blocks in a CU may be disabled. When the blending operation is indicated to be disabled, the following methods may be applied. It is noted that no matter which method is applied, the weighting values assigned to each respective sample on P2 are set to equal to 1 minus the weighting values assigned to the corresponding samples on P1.

In some examples described in U.S. Provisional Patent Application 62/857,584, when blending samples from partitions P1 and P2, the weighting values assigned to each respective sample on P1 are reset to be equal to (#a) 8/8 if they are larger than 4/8, (#b) 4/8 if they are equal to 4/8 and (#c) 0/8 if they are smaller than 4/8.

Figure 18:
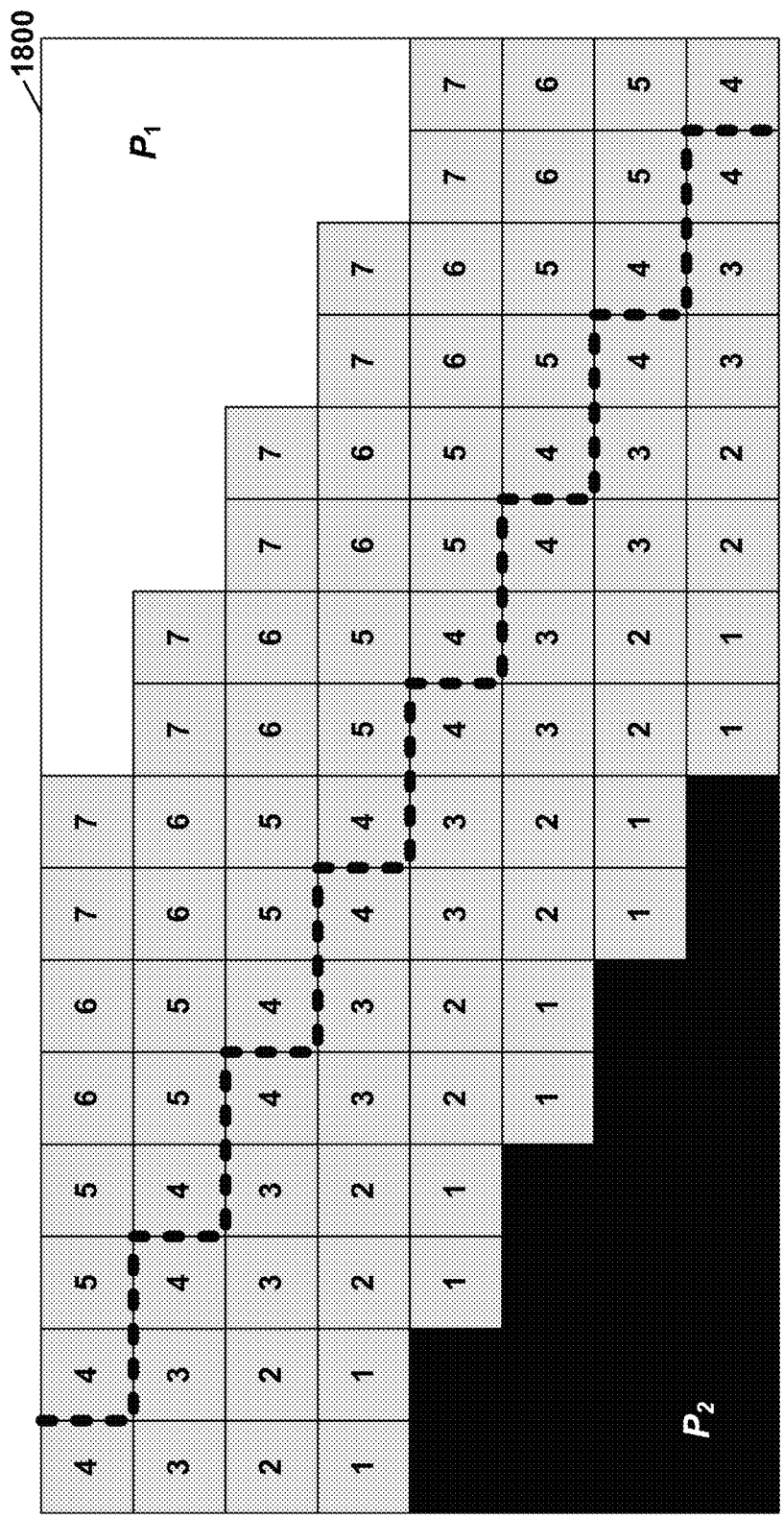
FIG. 18 is a conceptual diagram illustrating weights used in the blending process for a non-square CU with a stride width equal to 2 samples for luma.
Figure 19:
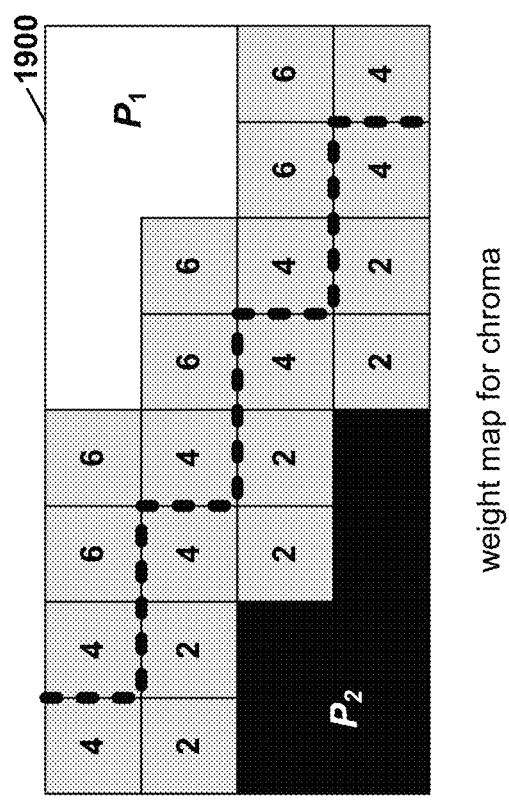
FIG. 19 is a conceptual diagram illustrating weights used in the blending process for a non-square CU with a stride width equal to 2 samples for chroma.

In some examples, the configuration of #b (that is, 4/8) is replaced by 8/8. In some examples, the configuration of #b (that is, 4/8) is replaced by 0/8. In some examples, the configuration of #b (that is, 4/8) is replaced by either 0/8 or 8/8, depending on the split direction of the triangle (e.g., 8/8 if 45°; 0/8 if 135° split). In some examples, when the width of the stride with 4/8 weight as in #b is larger than 1 sample (e.g., the stride width being equal to N samples if the width-to-height ratio is N or 1/N, where N=2,4,8, . . . ), samples on half of the stride are assigned with a weighting value equal to 8/8 if they are spatially closer to P1's corner while samples on the other half are assigned with 0/8. For example, FIG. 18 and FIG. 19 show that the weighting values assigned to each respective sample on P1 are reset to be equal to 8/8 if these samples sit on the corner closer to P1, and the rest are assigned with 0/8. Specifically, FIG. 18 is a conceptual diagram illustrating weights used in the blending process for a non-square CU with a stride width equal to 2 samples for luma. In other words, FIG. 18 illustrates example weights used in the blending process for a luma block 1800 of a non-square CU. FIG. 19 is a conceptual diagram illustrating weights used in the blending process for a non-square CU with a stride width equal to 2 samples for chroma. In other words, FIG. 18 illustrates example weights used in the blending process for a luma block 1900 of the non-square CU. In the example of FIG. 18 and FIG. 19, samples sitting to the right of the dashed line are assigned with a weighting value of 8/8 while others are assigned with 0/8. It is noted that a sequence-, tile-group-, slice-, CTU-level flag may be introduced in the bitstream to indicate whether the simplified blending methods are disabled or not.

Simplified motion compensation with non-fractional motions: U.S. Provisional Patent Application 62/857,584 also described simplified motion compensation with non-fractional motions. More specifically, U.S. Provisional Patent Application 62/857,584 described techniques in which motion vectors pointing to fractional-pel positions may be disabled. A sequence-, tile-group-, slice-, CTU-level flag may be introduced in the bitstream to indicate usage of the techniques in which motion vectors pointing to fractional-pel positions are disabled. When this new flag is enabled, all the motion vectors should be of integer precision and thus the fractional interpolation which blends sharp prediction signals can be avoided. The following elaborate how this new flag works with all the inter prediction modes when the flag is enabled.

Regular inter mode: The CABAC engine skips parsing the bits that represents fractional-precision MVD from AMVR (Adaptive Motion Vector Resolution) syntax. Thus, AMVR supports non-fractional-pel precisions only.
  Regular affine mode: The CABAC engine skips parsing the bits that represent fractional-precision MVD from AMVR syntax. Thus, AMVR supports non-fractional-pel precisions only. In addition, in some examples, the derived affine motions can be clipped or rounded (with a predefined offset value) to a non-fractional precision before they are used in motion compensation.
  Regular merge mode: Candidate motion vectors of regular merge mode are clipped or rounded (with a predefined offset value) to a non-fractional precision before the candidate motion vectors are used in motion compensation.
  TPM merge mode: The referenced merge candidates are clipped or rounded (with a predefined offset value) to a non-fractional precision before the merge candidates are used to construct the TPM candidate list. In addition, in some examples, the flag that indicated the usage of simplified blending methods (see section of this disclosure entitled "Simplified blending method along triangle partition edge") can be inferred to be enabled.
  MMVD mode: The referenced merge candidates that are used to form the basis vectors of MMVD mode have to be clipped or rounded (with a predefined offset value) to a non-fractional precision before the referenced merge candidates are used. In addition, in some instances, fractional offset values in MMVD distance table may be disabled.
  CIIP mode: The referenced merge candidates have to be clipped or rounded (with a predefined offset value) to a non-fractional precision before the referenced merge candidates are used in motion compensation. In some instances, CIIP mode may be disabled completely in the bitstream when the new flag is enabled.

Additionally, in some examples described in U.S. Provisional Patent Application 62/857,584, Adaptive Loop Filter and Deblocking Filter may be disabled when the new flag is enabled.

As described in U.S. Patent Application 62/861,811, filed Jun. 14, 2019, by using the methods for simplifying the motion vector storage of triangle partition mode described in U.S. Provisional Patent Application 62/857,584 to only store uni-directional motion vectors, and by disabling the blending operation of the triangle partition mode, the triangle partition mode can be allowed in P-slices.

Because various versions of VVC introduce many new inter coding tools, such as those described above, some of the new inter coding tools may have been mature enough to cover versatile coding scenarios, while some are not. For example, a weighted-averaging operation that combines two prediction signals into one may be harmful to the compression quality of video contents with extremely sharp signals (e.g., screen content). Accordingly, this disclosure describes several example modifications that may be made on existing inter coding tools for further improvement on compression quality. Such modifications may be used separately or in any combination.

A first aspect of this disclosure relates to blending-off conditions for triangle merge mode. For instance, a weak blending-off condition may be applied. For instance, in some examples, the blending operation of TPM can be switched off based on the prediction mode of a causal neighboring block. When the respective prediction modes of the left block and the above (i.e., top) block (in FIG. 11) are coded by either Intra Block Copy mode (IBC) or Palette mode (PL), the blending operation of TPM is turned off at the current TPM CU. Otherwise, the blending operation is turned on without change. In particular, when a blending operation is turned off, the motion compensation of a TPM CU can be performed in the same way as disclosed in U.S. Patent Application 62/861,811, the section above entitled "Simplified blending method along triangle partition edge," or the section above entitled "Simplified motion compensation with non-fractional motions." A sequence-, tile-group-, slice-, CTU-level flag may be introduced in the bitstream to indicate whether the blending-off condition is considered or not to disable blending operation.

In some examples of this disclosure, the blending-off condition can be defined even stronger, that is, when at least one of the left block and above block is coded by either IBC or PL, the blending operation of TPM is turned off at the current TPM CU. Otherwise (i.e., neither the left block nor the above block are IBC-coded and PL-coded), the blending operation is turned on without change. Except for this rule, the rest are all the same as disclosed in the above with respect to the weak blending-off condition.

In some examples, a deblocking filter can be disabled for the reconstructed samples of TPM CUs based on the prediction mode of a causal neighboring block. The rule can be the same as either weak or strong blending-off condition. In a weak blending-off condition example, when the blending-off condition is satisfied, TPM-coded pixels sitting on the either side of the boundary to which deblocking filter would be applied are not filtered. Otherwise, TPM-coded pixels are filtered by the deblocking filter. A sequence-, tile-group-, slice-, CTU-level flag may be introduced in the bitstream to indicate whether the deblocking-off condition is considered or not to disable deblocking filtering.

SAO-off condition: This example is the same as the deblocking-off condition, except that the subject becomes SAO.

ALF-off condition: This example is the same as the deblocking-off condition, except that the subject becomes ALF.

High-level syntax based deblocking-off condition: Whether or not the deblocking filter is turned off for some pixels of the current picture can be determined by a high-level syntax flag.

- In some examples, a sequence-level flag is introduced to prevent applying a deblocking filter to all TPM-coded CUs.
- In some examples, a picture-level flag is introduced to prevent applying a deblocking filter to TPM-coded CUs in a picture.
- In some examples, a tile-group flag is introduced to prevent applying a deblocking filter to TPM-coded CUs in a tile.
- In some examples, a slice-level flag is introduced to prevent applying a deblocking filter to TPM-coded CUs in a slice.
- In some examples, a CTU-level flag is introduced to prevent applying a deblocking filter to TPM-coded CUs in a CTU.

High-level syntax based SAO-off condition: This example is the same as the high-level syntax based deblocking-off condition, except that the subject becomes SAO.

High-level syntax based ALF condition: This example is the same as the high-level syntax based deblocking-off condition, except that the subject becomes ALF.

A second aspect of this disclosure relates to CIIP-off conditions. For instance, in the second aspect of this disclosure, one or more modifications may made to CIIP, as follows.

Weak CIIP-off condition: In some examples, the CU-level flag of CIIP mode may not be present in the bitstream and is inferred as 0. This may occur when the respective prediction modes of the left block and the above block (e.g., as shown in FIG. 11) are coded by either Intra Block Copy mode (IBC) or palette mode (PL). Otherwise, the CU-level flag of CIIP is still present in the bitstream. It is noted that a sequence-, tile-group-, slice-, or CTU-level flag may be introduced in the bitstream to indicate whether the CIIP-off condition is considered or not to disable blending operation.

Strong CIIP-off condition: In some examples, the CIIP-off condition can be defined even stronger, that is, when at least one of the left block and above block is coded by either IBC or PL, the CIIP is not present in the bitstream and is inferred as 0. Otherwise (i.e., none of left block and above block are IBC-coded and PL-coded), the CIIP-flag is still present in the bitstream. Except for this rule, the rest are all the same as disclosed in the above paragraph of the weak CIIP-off condition.

Deblocking-off condition: In some examples, a deblocking filter can be disabled for the reconstructed samples of some pixels based on the prediction mode of a causal neighboring block. The rule can be the same as either weak or strong CIIP-off condition. Without loss of generality, take a weak CIIP-off condition as an example. In this example, when the CIIP-off condition is satisfied for a CU, samples of this CU sitting on the either side of the boundary to which the deblocking filter would be applied are not filtered. Otherwise, samples of this CU are filtered by the deblocking filter. A sequence-, tile-group-, slice-, and/or CTU-level flag may be introduced in the bitstream to indicate whether the deblocking-off condition is considered or not to disable deblocking filtering.

SAO-off condition: This example is the same as the deblocking-off condition, except that the subject becomes SAO.

ALF-off condition: This example is the same as the deblocking-off condition, except that the subject becomes ALF.

A third aspect of this disclosure relates to modifications on inter modes with symmetric MVD (SMVD). For instance, in the third aspect of this disclosure, one or more modifications may made to SMVD, as follows.

Equal-POC-distance constraint: In some examples of this disclosure, an additional constraint of equal-POC distance is imposed on SMVD. With this constraint, the two reference pictures of a SMVD CU should be (a) one from the future (in output order) and the other from the past (in output order) and (b) with identical absolute value of POC distance relative to the current picture. Supposing there are several reference picture pairs between L0 and L1 reference picture lists, the one with the shortest POC distance relative to the current picture is selected as the reference picture pair of SMVD mode. Thus, in some examples, a constraint may be imposed that requires an L0 reference picture and an L1 reference picture to have equal POC distances from the current picture. This constraint may improve performance of the video coders because the video coder may mirror the MVD, and thereby potentially avoiding a step of scaling the MVD for one of the L0 or L1 reference pictures.

MVD scaling: In some examples, the MVD of L1 is derived from mapping the MVD of L0 to L1, where the mapping function is the same as applied for MV scaling. In other words, the L1 MVD may be determined by mapping the L0 MVD to L1. For example, the absolute value of the POC distance from the L0 reference picture to the current one is M and the absolute value of the POC distance from the L1 reference picture to the current one is N, then the scaling factor is N/M.

CU-level inference of reference indices: In some examples, the respective reference index of L0 and L1 can be inferred from the first available bi-directional candidate in regular merge candidate list. In some examples, the respective reference index of L0 and L1 can be inferred from the first candidate in the regular merge candidate list. If the first candidate the regular merge candidate list is not a bi-directional candidate, then SMVD is not tested for the particular CU or reverts back to the reference index pair as introduced above with respect to symmetric MVD coding. Thus, in some examples, to determine an L0 reference picture and an L1 reference picture, the video coder may determine an L0 reference index and an L1 reference index from a first-available bi-directional candidate in a merge candidate list. The first-available bi-directional candidate is an available bi-directional candidate that occurs at a lowest index of any available bi-directional candidate in the merge candidate list. The L0 reference index indicates a position in L0 of the L0 reference picture and the L1 reference index indicates a position in L1 of the L1 reference picture.

Furthermore, in the third aspect of this disclosure modifications to decoder-side MV refinement (DMVR) may be applied as follows.

AMVP-candidate-based DMVR: In some examples, the base vectors of DMVR mode can be formed by using both the L0 and L1 AMVP candidate lists of SMVD mode. Because each AMVP candidate list includes two motion vector predictors, 4 new sets of base vectors are formed and are to be refined by DMVR. Similar to the section above entitled "Decoder-Side Motion Vector Refinement" which describes that DMVR has up to 6 sets of basis vectors for refinement, the present disclosure introduces 4 new sets of base vectors for refinement. It is noted that no matter the reference picture pair of SMVD follows equal-POC-distance constraint or not, DMVR can always be applied to the 4 new sets of base vectors.

Thus, in this example, a video coder (e.g., video encoder 200 or video decoder 300) may form, in a symmetric motion vector difference mode, a List 0 (L0) base vector using a L0 AMVP candidate list and a List 1 (L1) base vector using a L1 AMVP candidate list. Additionally, in this example, the video coder may determine a refined L0 motion vector and a refined L1 motion vector by performing a decoder-side motion vector refinement process that refines the L0 base vector and the L1 base vector. The video coder may use the refined L0 motion vector and the refined L1 motion vector to determine a prediction block for a current block of a current picture of the video data. The video coder may reconstruct the current block based on the prediction block.

DMVR for affine subblocks: In some examples, DMVR can be applied to affine CUs for subblock MV refinement if the affine motion field is bi-directional.

DMVR for affine CPMVs: In some examples, DMVR can be applied to bi-directional affine CPMVs for MV refinement. For each N×N block with bi-directional CPMVs at the center, the bi-directional CPMVs is regarded as if the N×N block were the true motion of this N×N block and thus DMVR can be applied directly to this N×N block with bi-directional motion field. (The value of N is power-of-2, e.g., 4, 8, 16). After each of the CPMVs is refined, the CPMVs are used to form subblock motion fields and are then used to perform motion compensation.

Furthermore, in the third aspect of the disclosure, modifications may be made in merge mode with MVD (MMVD). For instance, this disclosure introduces explicitly signaled L0 MVD to MMVD as an alternative way to represent motion vector distance other than the direction-plus-offset manner in the current VVC standard. This disclosure describes four different ways to realize this new MMVD mode. It is noted that the below-mentioned "L0" can be replaced by L1 if the MMVD base vector happens to be uni-directional.

The new MMVD mode reuses "direction" and signals either L0 MVDx or L0 MVDy without an MVD sign flag.

The new MMVD mode reuses the first bit (which represents x/y direction) of "direction" and signals either L0 MVDx or L0 MVDy.

The new MMVD mode signals both L0 MVDx and L0 MVDy with a 1-D restriction (i.e., L0 MVDy is parsed only when MVDx is 0).

The new MMVD mode signals both L0 MVDx and L0 MVDy in the same way as regular inter mode.

As the new MMVD mode uses MVD syntax to represent a MMVD's distance offset, there are two different ways to realize MMVD's multi-resolution distance tables (i.e., fractional distance table and integer distance table).

The new MMVD mode can reuse the CU-level AMVR syntax to support multi-resolution distance tables.

The new MMVD mode can reuse original MMVD's slice-level flag to switch between a fractional (i.e., same as implying AMVR=0 to whole slice) and an integer distance table (i.e., same as implying AMVR=1 to whole slice).

Once the L0 MVD is determined, the L1 MVD can be either mapped to L1 as the current MMVD does or mirrored to L1.

It is noted that a sequence-, tile-group-, slice-, or CTU-level flag may be introduced in the bitstream to indicate whether the new MMVD mode is enabled or not.

A fourth aspect of this disclosure relates to modifications to affine prediction mode. For instance, in the fourth aspect of this disclosure, one or more modifications may be made to CPMV signaling with both an affine merge index and an AMVP index. More specifically, this disclosure proposes an alternative affine prediction mode to find an affine motion representation that requires signaling motion overhead between affine merge mode and affine AMVP mode. In VVC, the affine motion field of a CU is represented by either (1) one merge index for all CPMVs or (2) few AMVP indices and MVDs for all CPMVs. An idea of this disclosure is to combine both of them (i.e. "one merge index for some CPMVs" plus "AMVP indices and MVDs for other CPMVs") to leverage between motion overhead and motion field accuracy. The below tables show options for variety of configurations to implement the idea of this disclosure.

4-Parameter Affine Prediction: There are 2 options for CPMV0 and 4 for CPMV1. In total, there are six different configurations for 4-p Affine prediction. In the table, "Merge" denotes that the motion vectors of a CPMV is derived from a Affine merge candidate indicated by a merge candidate index, and "AMVP" means the motion vector of a CPMV is indicated by AMVP index pointing to an entry of Affine AMVP list. "+MVD" and "+MMVD" denotes that the motion vector of a CPMV can be added with an MVD and MMVD's direction and distance offset, respectively.

In addition, the configuration options of CPMV0 and CPMV1 can be swapped between each other. (i.e. CPMV0 can have options {A, B, C} and CPMV1 can have options {1, 2})

| CPMV 0 | CPMV 1 |
|---|---|
| (1) Merge | (A) AMVP + MVD |
| (2) Merge + MVD | (B) Merge + MVD |
| | (C) Merge + MMVD |

6-Parameter Affine Prediction: There are 2 options for CPMV0, 4 for CPMV1 and 3 for CPMV2. In total, there are 24 different configurations for 6-p Affine prediction.

| CPMV 0 | CPMV 1 | CPMV 2 |
|---|---|---|
| (1) Merge | (A) AMVP + MVD | (a) AMVP + MVD |
| (2) Merge + MVD | (B) Merge + MVD | (b) Merge + MVD |
| | (C) Merge + MMVD | (c) Merge + MMVD |
| | (D) Merge | |

It is noted that a sequence-, tile-group-, slice-, or CTU-level flag may be introduced in the bitstream to indicate whether the alternative affine prediction mode is enabled or not.

In some examples of this disclosure, when the slice-header syntax, mvd_l1_zero_flag, is enabled, zero MVD is not assigned to the L1 MVD of each CPMV but is assigned to both L0 and L1 MVDs of some CPMVs. An MVD is not signaled if the MVD is assigned with a zero MVD.

4-Parameter Affine Prediction: A zero MVD is assigned to the L0 and L1 MVDs of CPMV1 only.

6-Parameter Affine Prediction: A zero MVD is assigned to the L0 and L1 MVDs of CPMV1 and CPMV2 only. In another configuration, a zero MVD can be assigned to L0 and L1 MVDs of CPMV2 only.

A sequence-, tile-group-, slice-, or CTU-level flag may be introduced in the bitstream to indicate whether the re-assignment of zero vector to CPMVs is enabled or not.

A fifth aspect of this disclosure relates to modifying a prediction block with an offset. For instance, a video coder (e.g., video encoder 200 or video decoder 300) may add an offset value to the prediction samples of a CU (before the prediction samples of the CU are rounded to internal bit depth) and the value of this offset value should be smaller than the quantization step size of the DC transform coefficient. For example, d can be the bit-depth difference between an internal bit depth and a high-precision processing bit depth (e.g., 14 for HEVC inter prediction) and $Q_{step}$ can denote the quantization step size. The candidate list of offset values can be {0, s, 2s, 3s, 4s, 5s, ... } or {0, s, 2s, 4s, 8s, 16s, ... }, where s=d*$Q_{step}$>>N and N is a power-of-2 number. Once the candidate list is determined, a CU-level index is signalled to indicate the use of the offset value, e.g., n for the $n^{th}$ entry in the candidate list. Thus, in this example, prior to reconstructing a current block based on a prediction block, the video coder may add an offset value to prediction samples of the prediction block of the CU, wherein the offset value is smaller than a quantization step size of the DC transform coefficient. The video coder may reconstruct the current block at least in part by combining the prediction block and the residual block.

Figure 20:
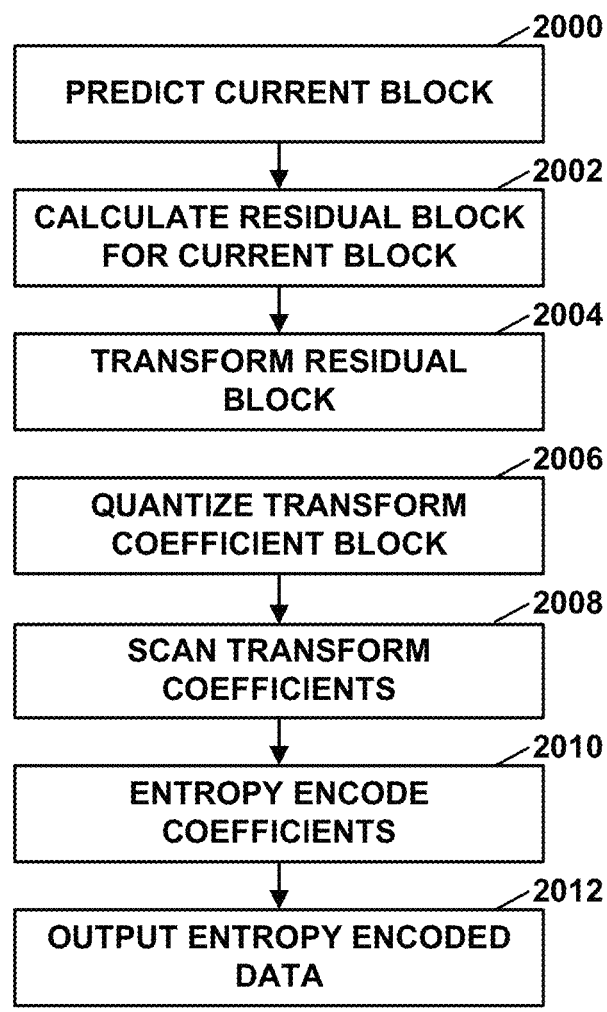
FIG. 20 is a flowchart illustrating an example method for encoding a current block.

FIG. 20 is a flowchart illustrating an example method for encoding a current block. The current block may be a current CU. Although described with respect to video encoder 200 (FIGS. 1 and 2), it should be understood that other devices may be configured to perform a method similar to that of FIG. 20.

In this example, video encoder 200 initially predicts the current block (2000). For example, video encoder 200 may form a prediction block for the current block. Video encoder 200 may form the prediction block according to any of a TPM mode, a CIIP mode, a SMVD mode, a DMVR mode, a MMVD mode, an affine prediction mode, zero MVD assignment to CPMV, and/or offsets, according to the techniques of this disclosure as discussed above. In some examples, to form the prediction block, video encoder 200 (e.g., motion estimation unit 222 of video encoder 200) may form, in a symmetric motion vector difference mode, a List 0 (L0) base vector using a L0 Advanced Motion Vector Prediction (AMVP) candidate list and a List 1 (L1) base vector using a L1 AMVP candidate list. Video encoder 200 (e.g., motion estimation unit 222 of video encoder 200) may determine a refined L0 motion vector and a refined L1 motion vector by performing a decoder-side motion vector refinement process that refines the L0 base vector and the L1 base vector. In this example, video encoder 200 (e.g., motion compensation unit 224 of video encoder 200) may use the refined L0 motion vector and the refined L1 motion vector to determine a prediction block for a current block of a current picture of the video data.

Video encoder 200 may then calculate a residual block for the current block (2002). To calculate the residual block, video encoder 200 may calculate a difference between the original, unencoded block and the prediction block for the current block. Video encoder 200 may then transform the residual block to generate a transform coefficient block (2004). Video encoder 200 may then quantize the transform coefficients of the transform coefficient block (2006). Next, video encoder 200 may scan the quantized transform coefficients of the transform coefficient block (2008). During the scan, or following the scan, video encoder 200 may entropy encode the transform coefficients (2010). For example, video encoder 200 may encode the transform coefficients using CAVLC or CABAC. Video encoder 200 may then output the entropy encoded data (2012).

Figure 21:
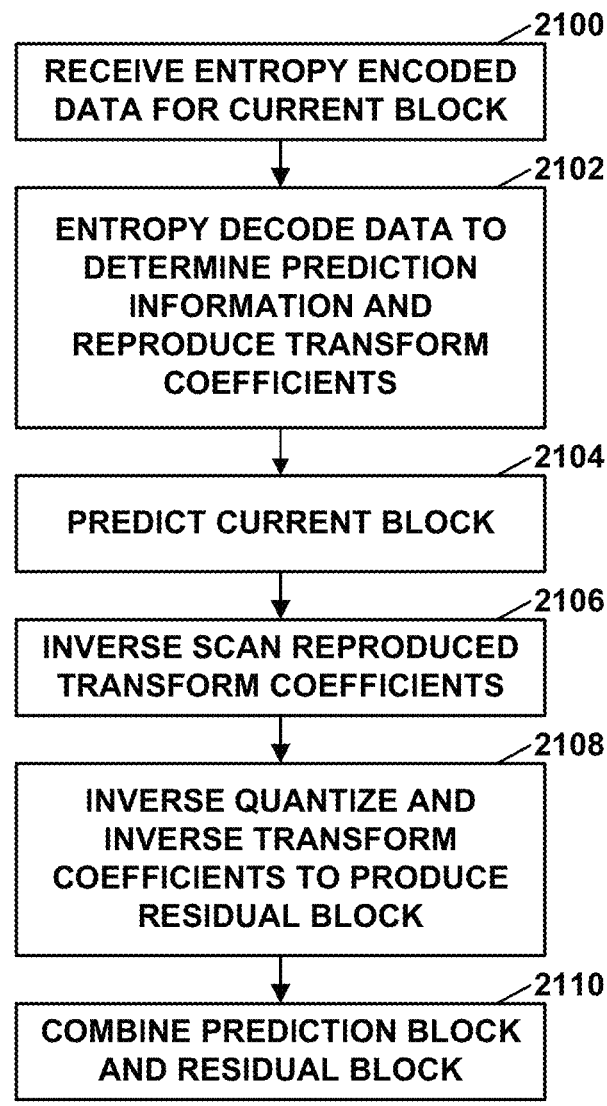
FIG. 21 is a flowchart illustrating an example method for decoding a current block of video data.

FIG. 21 is a flowchart illustrating an example method for decoding a current block of video data. The current block may be a current CU. Although described with respect to video decoder 300 (FIGS. 1 and 3), it should be understood that other devices may be configured to perform a method similar to that of FIG. 21.

Video decoder 300 may receive entropy encoded data for the current block, such as entropy encoded prediction information and entropy coded data for transform coefficients of a residual block corresponding to the current block (2100). Video decoder 300 may entropy decode the entropy encoded data to determine prediction information for the current block and to reproduce transform coefficients of the residual block (2102). Video decoder 300 may predict the current block (2104), e.g., using an intra- or inter-prediction mode as indicated by the prediction information for the current block, to calculate a prediction block for the current block. For example, video decoder 300 may form the prediction block according to any of TPM mode, CIIP mode, SMVD mode, DMVR mode, MMVD mode, affine prediction mode, zero MVD assignment to CPMV, and/or offsets, according to the techniques of this disclosure as discussed above.

In some examples, to form the prediction block, video decoder 300 (e.g., motion compensation unit 316 of video decoder 300) may form, in a symmetric motion vector difference mode, a List 0 (L0) base vector using a L0 Advanced Motion Vector Prediction (AMVP) candidate list and a List 1 (L1) base vector using a L1 AMVP candidate list. Video decoder 300 (e.g., motion compensation unit 316 of video decoder 300) may determine a refined L0 motion vector and a refined L1 motion vector by performing a decoder-side motion vector refinement process that refines the L0 base vector and the L1 base vector. In this example, video decoder 300 (e.g., motion compensation unit 316 of video decoder 300) may use the refined L0 motion vector and the refined L1 motion vector to determine a prediction block for a current block of a current picture of the video data.

Video decoder 300 may then inverse scan the reproduced transform coefficients (2106), to create a block of quantized transform coefficients. Video decoder 300 may then inverse quantize and inverse transform the transform coefficients to produce a residual block (2108). Video decoder 300 may ultimately decode the current block by combining the prediction block and the residual block (2110).

Figure 22:
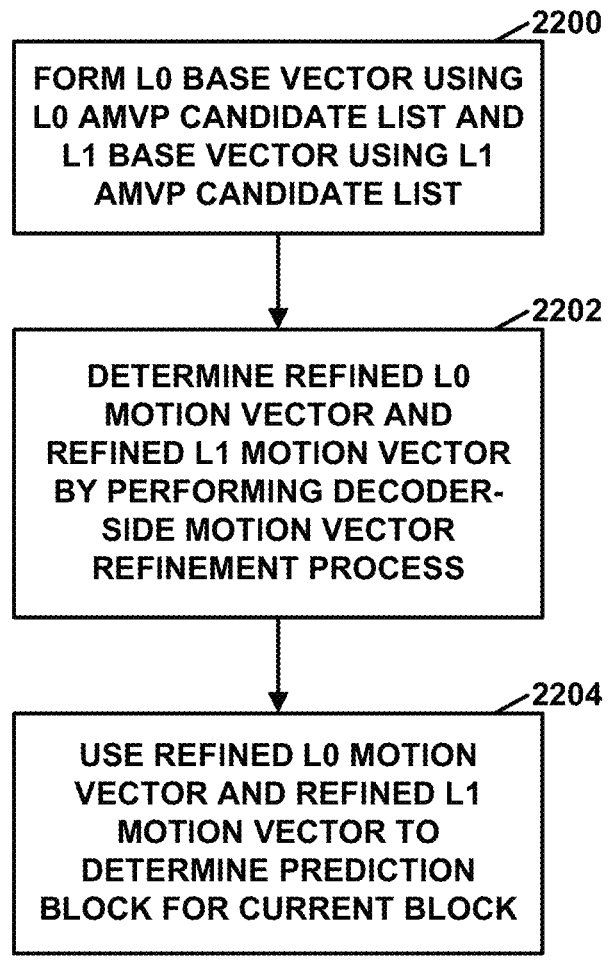
FIG. 22 is a flowchart showing an example operation of a video coder in accordance with one or more techniques of this disclosure.

FIG. 22 is a flowchart showing an example operation of a video coder in accordance with one or more techniques of this disclosure. A video coder, such as video encoder 200 (e.g., motion estimation unit 222 and/or motion compensation unit 224 of video encoder 200) or video decoder 300 (e.g., motion compensation unit 316 of video decoder 300) may perform the operation of FIG. 22. In the example of FIG. 22, the video coder may form, in a symmetric motion vector difference mode, a L0 base vector using a L0 AMVP candidate list and a L1 base vector using a L1 AMVP candidate list (2200). For example, to form the L0 base motion vector and the L1 base motion vector, the video coder may determine a L0 reference picture and a L1 reference picture. Because the video coder forms the L0 base vector and the L1 base vector in the symmetric motion vector difference mode, the L0 reference picture is a nearest reference picture to the current picture in L0, the L1 reference picture is a nearest reference picture to the current picture in L1, and the L0 reference picture and the L1 reference picture form a forward and backward pair or a backward and forward pair. Furthermore, the video coder may determine the L0 AMVP candidate list and may determine the L1 AMVP candidate list. In some examples, a video coding standard according to which the video data is coded (e.g., VVC or another video coding standard) may impose a constraint that requires an L0 reference picture and an L1 reference picture to have equal POC distances from the current picture. The video coder may determine the L0 AMVP candidate list and may determine the L1 AMVP candidate list.

Additionally, as part of forming the L0 base motion vector and the L1 base motion vector, the video coder may determine a L0 MVP flag, a L1 MVP flag, and a L0 MVD. For instance, video encoder 200 may perform a process to determine the L0 MVP flag, the L1 MVP flag, and the L0 MVD that evaluates different values of the L0 MVP flag, the L1 MVP flag, and the L0 MVD to select optimal values of the L0 MVP flag, the L1 MVP flag, and the L0 MVD. The L0 MVP flag, the L1 MVP flag, and the L0 MVD may be signaled in the bitstream. Video decoder 300 may determine the L0 MVP flag, the L1 MVP flag, and the L0 MVD based on values of the L0 MVP flag, the L1 MVP flag, and the L0 MVD signaled in the bitstream. The video coder may determine a L1 MVD by mapping the L0 MVD to L1. For example, the video coder may set the L1 MVD equal to the negative of the L0 MVD. In some examples, the video coder may determine the L1 MVD by scaling an absolute value of the L0 MVD using a scaling factor of N/M, where N indicates a POC distance from the L1 reference picture to the current picture and M indicates a POC distance from the L0 reference picture to the current picture.

In some examples, to determine the L0 reference picture and the L1 reference picture, the video coder may determine a L0 reference index and a L1 reference index from a first-available bi-directional candidate in a merge candidate list. The L0 reference index indicates a position in L0 of the L0 reference picture and the L1 reference index indicates a position in L1 of the L1 reference picture. The video coder may determine the merge candidate list as described elsewhere in this disclosure. Determining the L0 reference index and the L1 reference index in this way may improve coding efficiency because video encoder 200 has already previously determined that a useable prediction relationship exists between the L0 reference picture and the L1 reference picture with respect to the bi-directional candidate in the merge candidate list.

Furthermore, as part of forming the L0 base motion vector and the L1 base motion vector, the video coder may form the L0 base vector as the L0 MVD plus a motion vector in the L0 AMVP candidate list indicated by the L0 MVP flag. The video coder may form the L1 base vector as the L1 MVD plus a motion vector in the L1 AMVP candidate list indicated by the L1 MVP flag.

Additionally, in the example of FIG. 22, the video coder may determine a refined L0 motion vector and a refined L1 motion vector by performing a decoder-side motion vector refinement process that refines the L0 base vector and the L1 base vector (2202). Although referred to as a decoder-side process, the decoder-side motion vector refinement process may be performed by both video encoder 200 and video decoder 300. As part of performing the decoder-side motion vector refinement process, the video coder may perform a local search based on bilateral matching within a pre-defined 5×5 search range around the locations indicated by the L0 base vector and the L1 base vector. The local search may be performed in a raster scan order from the top-left corner of a 5×5 search range surrounding the location indicated by the L0 base vector or the L1 base vector. Following the local search, the video coder determines an optimal delta MV (i.e. $\Delta$) which leads to the lowest bilateral matching cost, where the cost function is defined as the distortion between $I_0(x+v_0+\Delta)$ and $I_1(x+v_1-\Delta)$. The distortion function may be a sum of absolute differences. The video coder may optimize the output MV pair (denoted as $v_0+\Delta^*$ and $v_1-\Delta^*$, $\Delta^*$ as optimized $\Delta$ among 5×5 window) again at sub-pel precision, thereby determining the refined L0 motion vector and the refined L1 motion vector.

The video coder may use the refined L0 motion vector and the refined L1 motion vector to determine a prediction block for a current block of a current picture of the video data (2204). For example, to use the refined L0 motion vector and the refined L1 motion vector to determine the prediction block for the current block, the video coder may determine an L0 prediction block based on samples of a L0 reference picture for a location indicated by the refined L0 motion vector. Additionally, the video coder may determine an L1 prediction block based on samples of a L1 reference picture for a location indicated by the refined L1 motion vector. The video coder may then combine (e.g., by averaging) the L0 prediction block and the L1 prediction block to determine the prediction block for the current block.

Furthermore, in some examples, the video coder (e.g., reconstruction unit 310 of video decoder 300 or reconstruction unit 214 of video encoder 200) reconstructs the current block based on the prediction block. For example, the video coder may add residual samples to corresponding samples of the prediction block to reconstruct the current block.

In accordance with some examples of this disclosure, the video coder (e.g., inverse quantization unit 210 of video encoder 200 or inverse quantization unit 306 of video decoder 300) may inverse quantize the transform coefficient block. The transform coefficient block includes a DC transform coefficient. Furthermore, the video coder (e.g., inverse transform processing unit 212 of video encoder 200 or inverse transform processing unit 308 of video decoder 300) may apply an inverse transform to the inverse quantized transform coefficient block to generate residual data. Prior to reconstructing the current block based on the prediction block, the video coder may add an offset value to prediction samples of the prediction block of the CU. The options of the offset value can be partially smaller or larger than a quantization step size of the DC transform coefficient. The video coder (e.g., reconstruction unit 214 of video encoder 200 or reconstruction unit 310 of video decoder 300) may reconstruct the current block based on the prediction block by combining the prediction block and the residual block. An possible advantage of adding an offset value to prediction block is two-fold: (1) it is a syntax shortcut of DC and (2) it preserves partially the energy of DC that is going to be quantized under deadzone.

The following is a non-limiting list of examples that are in accordance with the techniques of this disclosure.

Example 1. A method of coding video data, the method including any one or combination of the techniques set forth in this disclosure.

Example 2. The method of example 1, wherein the method includes switching off a blending operation of a triangle prediction merge mode (TPM) based on a prediction mode of a causal neighbor block of a TPM-coded current block.

Example 3. The method of example 2, wherein switching off the blending operation of the TPM includes switching off the blending operation of the TPM based on both an above causal neighbor block and a left causal neighbor block being coded using one of an Intra Block Copy (IBC) mode or a palette mode.

Example 4. The method of example 2, wherein switching off the blending operation of the TPM includes switching off the blending operation of the TPM based on either an above causal neighbor block or a left causal neighbor block being coded using one of an Intra Block Copy (IBC) mode or a palette mode.

Example 5. The method of any of examples 1-4, further including disabling a deblocking filter for reconstructed samples of a TPM-coded current block based on a prediction mode of a causal neighbor of the TPM-coded current block.

Example 6. The method of any of examples 1-5, further including disabling a Sample Adaptive Offset (SAO) filter for reconstructed samples of a TPM-coded current block based on a prediction mode of a causal neighbor of the TPM-coded current block.

Example 7. The method of any of examples 1-6, further including disabling an Adaptive Loop Filter (ALF) for reconstructed samples of the TPM-coded current block based on a prediction mode of a causal neighbor of the TPM-coded current block.

Example 8. The method of any of examples 1-7, further including determining whether to turn off a deblocking filter for one or more TPM-coded blocks based on a high-level syntax element.

Example 9. The method of any of examples 1-8, further including determining whether to turn off a SAO filter for one or more TPM-coded blocks based on a high-level syntax element.

Example 10. The method of any of examples 1-9, further including determining whether to turn off an ALF for one or more TPM-coded blocks based on a high-level syntax element.

Example 11. The method of any of examples 1-10, wherein a coding unit (CU)-level flag for Combined Intra-Inter Prediction (CIIP) mode is not signaled and inferred as 0 when prediction modes of a left neighboring block and an above neighboring block of a current block are coded using either IBC mode or pallet mode.

Example 12. The method of any of examples 1-11, wherein a CU-level flag for CIIP mode is not signaled and inferred as 0 when prediction modes of a left neighboring block and an above neighboring block of a current block are coded using either IBC mode or pallet mode.

Example 13. The method of any of examples 1-12, wherein a CU-level flag for CIIP mode is not signaled and inferred as 0 when prediction modes of either a left neighboring block and an above neighboring block of a current block is coded using either IBC mode or pallet mode.

Example 14. The method of any of examples 1-13, further including disabling a deblocking filter for reconstructed samples of a CIIP-coded current block based on a prediction mode of a causal neighbor of the CIIP-coded current block.

Example 15. The method of any of examples 1-14, further including disabling a Sample Adaptive Offset (SAO) filter for reconstructed samples of a CIIP-coded current block based on a prediction mode of a causal neighbor of the CIIP-coded current block.

Example 16. The method of any of examples 1-15, further including disabling an Adaptive Loop Filter (ALF) for reconstructed samples of the CIIP-coded current block based on a prediction mode of a causal neighbor of the CIIP-coded current block.

Example 17. The method of any of examples 1-16, wherein a constraint of equal-Picture Order Count (POC) distance is imposed on symmetric motion vector difference (SMVD).

Example 18. The method of any of examples 1-17, further including determining a reference index of L0 and L1 from a first-available bi-directional candidate in a merge candidate list.

Example 19. The method of any of examples 1-18, further including forming base vector of decoder-side motion vector refinement (DMVR) using both L0 and L1 Advanced Motion Vector Prediction (AMVP) candidate lists of SMVD mode.

Example 20. The method of any of examples 1-19, further including applying DMVR to affine CUs for subblock motion vector (MV) refinement based on an affine motion field being bi-directional.

Example 21. The method of any of examples 1-20, further including applying DMVR to bi-directional affine CPMVs for MV refinement.

Example 22. The method of any of examples 1-21, wherein a L0 MVD to Merge Mode with MVD (MMVD) is explicitly signaled in a bitstream that includes an encoded representation of the video data.

Example 23. The method of any of examples 1-22, further including adding an offset value to prediction samples of a CU, where the offset value is smaller than a quantization step size of a DC transform coefficient of a block of transform coefficients for the CU.

Example 24. The method of any of examples 1-23, wherein coding includes decoding.

Example 25. The method of any of examples 1-24, wherein coding includes encoding.

Example 26. A device for coding video data, the device including one or more means for performing the method of any of examples 1-25.

Example 27. The device of example 26, wherein the one or more means include one or more processors implemented in circuitry.

Example 28. The device of any of examples 26 and 27, further including a memory to store the video data.

Example 29. The device of any of examples 26-28, further including a display configured to display decoded video data.

Example 30. The device of any of examples 26-29, wherein the device includes one or more of a camera, a computer, a mobile device, a broadcast receiver device, or a set-top box.

Example 31. The device of any of examples 26-30, wherein the device includes a video decoder.

Example 32. The device of any of examples 26-31, wherein the device includes a video encoder.

Example 33. A computer-readable storage medium having stored thereon instructions that, when executed, cause one or more processors to perform the method of any of examples 1-25.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
    forming, in a symmetric motion vector difference mode, a List 0 (L0) base vector using a L0 Advanced Motion Vector Prediction (AMVP) candidate list and forming a List 1 (L1) base vector using a L1 AMVP candidate list, wherein forming the L0 base vector using the L0 AMVP candidate list and forming the L1 base vector using the L1 AMVP candidate list comprises:
        determining an L0 reference picture and an L1 reference picture, wherein the L0 reference picture is a nearest reference picture to a current picture of the video data in L0, the L1 reference picture is a nearest reference picture to the current picture in a reference picture list L1, and the L0 reference picture and L1 reference picture form a forward and backward pair or a backward and forward pair;
        determining a L0 motion vector predictor (MVP) flag, a L1 MVP flag, and a L0 motion vector difference (MVD);
        determining a L1 MVD by mapping the L0 MVD to the reference picture list L1;
        forming the L0 base vector as the L0 MVD plus a motion vector in the L0 AMVP candidate list indicated by the L0 MVP flag; and
        forming the L1 base vector as the L1 MVD plus a motion vector in the L1 AMVP candidate list indicated by the L1 MVP flag;
    determining a refined L0 motion vector and a refined L1 motion vector by performing a decoder-side motion vector refinement process that refines the L0 base vector and the L1 base vector, wherein the refined L0 motion vector indicates a location in the L0 reference picture and the refined L1 motion vector indicates a location in the L1 reference picture; and
    using the refined L0 motion vector and the refined L1 motion vector to determine a prediction block for a current block of the current picture of the video data.

2. The method of claim 1, wherein a video coding standard according to which the video data is coded imposes a constraint that requires the L0 reference picture and the L1 reference picture to have equal Picture Order Count (POC) distances from the current picture.

3. The method of claim 1, wherein determining the L1 MVD comprises scaling an absolute value of the L0 MVD using a scaling factor of N/M, where N indicates a POC distance from the L1 reference picture to the current picture and M indicates a POC distance from the L0 reference picture to the current picture.

4. The method of claim 1, wherein determining the L0 reference picture and the L1 reference picture comprises determining a L0 reference index and a L1 reference index from a first-available bi-directional candidate in a merge candidate list, wherein the L0 reference index indicates a position in L0 of the L0 reference picture and the L1 reference index indicates a position in L1 of the L1 reference picture.

5. The method of claim 1, wherein:
the current block is a coding unit (CU),
the method further comprises:
  inverse quantizing a transform coefficient block, wherein the transform coefficient block includes a DC transform coefficient;
  applying an inverse transform to the inverse quantized transform coefficient block to generate residual data;
  prior to reconstructing the current block based on the prediction block, adding an offset value to prediction samples of the prediction block of the CU, wherein the offset value is smaller than a quantization step size of the DC transform coefficient, and
  reconstructing the current block based on the prediction block by combining the prediction block and the residual block.

6. A device for coding video data, the device comprising:
a memory to store the video data; and
one or more processors implemented in circuitry, the one or more processors configured to:
  form, in a symmetric motion vector difference mode, a List 0 (L0) base vector using a L0 Advanced Motion Vector Prediction (AMVP) candidate list and form a List 1 (L1) base vector using a L1 AMVP candidate list, wherein the one or more processors are configured to, as part of forming the L0 base vector using the L0 AMVP candidate list and the L1 base vector using the L1 AMVP candidate list:
    determine an L0 reference picture and an L1 reference picture, wherein the L0 reference picture is a nearest reference picture to a current picture of the video data in a reference picture list L0, the L1 reference picture is a nearest reference picture to the current picture in a reference picture list L1, and the L0 reference picture and the L1 reference picture form a forward and backward pair or a backward and forward pair;
    obtain a L0 motion vector predictor (MVP) flag, a L1 MVP flag, and a L0 motion vector difference (MVD);
    determine a L1 MVD by mapping the L0 MVD to the reference picture list L1;
    form the L0 base vector as the L0 MVD plus a motion vector in the L0 AMVP candidate list indicated by the L0 MVP flag; and
    form the L1 base vector as the L1 MVD plus a motion vector in the L1 AMVP candidate list indicated by the L1 MVP flag;
    determine a refined L0 motion vector and a refined L1 motion vector by performing a decoder-side motion vector refinement process that refines the L0 base vector and the L1 base vector, wherein the refined L0 motion vector indicates a location in the L0 reference picture and the refined L1 motion vector indicates a location in the L1 reference picture; and
    use the refined L0 motion vector and the refined L1 motion vector to determine a prediction block for a current block of the current picture.

7. The device of claim 6, wherein a video coding standard according to which the video data is coded imposes a constraint that requires the L0 reference picture and the L1 reference picture to have equal Picture Order Count (POC) distances from the current picture.

8. The device of claim 6, wherein the one or more processors are configured such that, as part of determining the L1 MVD, the one or more processors scale an absolute value of the L0 MVD using a scaling factor of N/M, where N indicates a POC distance from the L1 reference picture to the current picture and M indicates a POC distance from the L0 reference picture to the current picture.

9. The device of claim 6, wherein the one or more processors are configured such that, as part of determining the L0 reference picture and the L1 reference picture, the one or more processors determine a L0 reference index and a L1 reference index from a first-available bi-directional candidate in a merge candidate list, wherein the L0 reference index indicates a position in L0 of the L0 reference picture and the L1 reference index indicates a position in L1 of the L1 reference picture.

10. The device of claim 6, wherein:
the block is a coding unit (CU), and
the one or more processors are further configured to:
  decode a transform coefficient block, wherein the transform coefficient block includes a DC transform coefficient;
  inverse quantize the transform coefficient block;
  apply an inverse transform to the inverse quantized transform coefficient block to generate residual data;
  prior to reconstructing the current block based on the prediction block, add an offset value to prediction samples of the prediction block of the CU, wherein the offset value is smaller than a quantization step size of the DC transform coefficient, and
  reconstruct the current block based on the prediction block comprises combining the prediction block and the residual block.

11. The device of claim 6, further comprising a display configured to display decoded video data.

12. The device of claim 6, wherein the device comprises one or more of a camera, a computer, a mobile device, a broadcast receiver device, or a set-top box.

13. A non-transitory computer-readable storage medium having stored thereon instructions that, when executed, cause one or more processors to:
form, in a symmetric motion vector difference mode, a List 0 (L0) base vector using a L0 Advanced Motion Vector Prediction (AMVP) candidate list and form a List 1 (L1) base vector using a L1 AMVP candidate list, wherein the instructions that cause the one or more processors to form the L0 base vector using the L0 AMVP candidate list and the L1 base vector using the L1 AMVP candidate list comprise instructions that cause the one or more processors to:
  determine an L0 reference picture and an L1 reference picture, wherein the L0 reference picture is a nearest reference picture to a current picture of video data in a reference picture list L0, the L1 reference picture is a nearest reference picture to the current picture in a reference picture list L1, and the L0 reference picture and the L1 reference picture form a forward and backward pair or a backward and forward pair;

obtain a L0 motion vector predictor (MVP) flag, a L1 MVP flag, and a L0 motion vector difference (MVD);

determine a L1 MVD by mapping the L0 MVD to the reference picture list L1;

form the L0 base vector as the L0 MVD plus a motion vector in the L0 AMVP candidate list indicated by the L0 MVP flag; and form the L1 base vector as the L1 MVD plus a motion vector in the L1 AMVP candidate list indicated by the L1 MVP flag;

determine a refined L0 motion vector and a refined L1 motion vector by performing a decoder-side motion vector refinement process that refines the L0 base vector and the L1 base vector, wherein the refined L0 motion vector indicates a location in the L0 reference picture and the refined L1 motion vector indicates a location in the L1 reference picture; and use the refined L0 motion vector and the refined L1 motion vector to determine a prediction block for a current block of the current picture.

14. The non-transitory computer-readable storage medium of claim 13, wherein a video coding standard according to which the video data is coded imposes a constraint that requires the L0 reference picture and the L1 reference picture to have equal Picture Order Count (POC) distances from the current picture.

15. The non-transitory computer-readable storage medium of claim 13, wherein the instructions that cause the one or more processors to determine the L1 MVD comprises instructions that cause the one or more processors to scale an absolute value of the L0 MVD using a scaling factor of N/M, where N indicates a POC distance from the L1 reference picture to the current picture and M indicates a POC distance from the L0 reference picture to the current picture.

16. The non-transitory computer-readable storage medium of claim 13, wherein the instructions that cause the one or more processors to determine the L0 reference picture and the L1 reference picture comprise instructions that cause the one or more processors to determine a L0 reference index and a L1 reference index from a first-available bi-directional candidate in a merge candidate list, wherein the L0 reference index indicates a position in L0 of the L0 reference picture and the L1 reference index indicates a position in L1 of the L1 reference picture.

17. The non-transitory computer-readable storage medium of claim 13, wherein:

the block is a coding unit (CU), execution of the instructions further causes the one or more processors to:

inverse quantize a transform coefficient block, wherein the transform coefficient block includes a DC transform coefficient;

apply an inverse transform to the inverse quantized transform coefficient block to generate residual data;

prior to reconstructing the current block based on the prediction block, add an offset value to prediction samples of the prediction block of the CU, wherein the offset value is smaller than a quantization step size of the DC transform coefficient, and reconstruct the current block based on the prediction block comprises combining the prediction block and the residual block.

\* \* \* \* \*